(12) United States Patent
Benko et al.

(10) Patent No.: US 9,201,520 B2
(45) Date of Patent: Dec. 1, 2015

(54) MOTION AND CONTEXT SHARING FOR PEN-BASED COMPUTING INPUTS

(71) Applicant: Microsoft Corporation, Redmond, WA (US)

(72) Inventors: Hrvoje Benko, Seattle, WA (US); Xiang Chen, Pittsburgh, PA (US); Kenneth Paul Hinckley, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 233 days.

(21) Appl. No.: 13/903,944

(22) Filed: May 28, 2013

(65) Prior Publication Data

US 2013/0257777 A1 Oct. 3, 2013

Related U.S. Application Data

(63) Continuation-in-part of application No. 13/026,058, filed on Feb. 11, 2011, now Pat. No. 8,988,398.

(51) Int. Cl.
| | | |
|---|---|---|
| *G06F 3/0354* | (2013.01) | |
| *G06F 3/038* | (2013.01) | |
| *G06F 3/0346* | (2013.01) | |

(52) U.S. Cl.
CPC .......... *G06F 3/03545* (2013.01); *G06F 3/0346* (2013.01); *G06F 3/0383* (2013.01); *G06F 3/03547* (2013.01)

(58) Field of Classification Search
CPC .............. G06F 3/0346; G06F 3/03545; G06F 3/03547; G06F 3/0383
USPC .................... 345/173–179; 178/18.01–20.01; 715/863
See application file for complete search history.

(56) References Cited

U.S. PATENT DOCUMENTS

| | | |
|---|---|---|
| 5,149,919 A | 9/1992 | Greanias et al. |
| 5,198,623 A | 3/1993 | Landmeier |

(Continued)

FOREIGN PATENT DOCUMENTS

| | | |
|---|---|---|
| KR | 10-2012-0005417 | 1/2012 |
| WO | 2009084809 A1 | 7/2009 |

OTHER PUBLICATIONS

Figueroa-Gibson, Gloryvid, U.S. Notice of Allowance, U.S. Appl. No. 12/970,943, filed Dec. 19, 2014, pp. 1-10.

(Continued)

*Primary Examiner* — Hong Zhou
(74) *Attorney, Agent, or Firm* — Alin Corie; Judy Yee; Micky Minhas

(57) ABSTRACT

A "Motion and Context Sharing Technique" uses a pen or stylus enhanced to incorporate multiple sensors, i.e., a "sensor pen," and a power supply to enable various input techniques and gestures. Various combinations of pen stroke, pressure, motion, and other sensor pen inputs are used to enable various hybrid input techniques that incorporate simultaneous, concurrent, sequential, and/or interleaved, sensor pen inputs and touch inputs (i.e., finger, palm, hand, etc.) on displays or other touch sensitive surfaces. This enables a variety of motion-gesture inputs relating to the context of how the sensor pen is used or held, even when the pen is not in contact or within sensing range of the computing device digitizer. In other words, any particular touch inputs or combinations of touch inputs are correlated with any desired sensor pen inputs, with those correlated inputs then being used to initiate any desired action by the computing device.

20 Claims, 8 Drawing Sheets

(56) References Cited

U.S. PATENT DOCUMENTS

| | | | |
|---|---|---|---|
| 5,414,227 A | 5/1995 | Schubert et al. | |
| 5,463,725 A | 10/1995 | Henckel et al. | |
| 5,625,833 A | 4/1997 | Levine | |
| 5,778,404 A * | 7/1998 | Capps et al. | 715/234 |
| 5,867,163 A | 2/1999 | Kurtenbach | |
| 5,914,701 A | 6/1999 | Gersheneld et al. | |
| 5,956,020 A | 9/1999 | D'Amico et al. | |
| 6,307,548 B1 | 10/2001 | Flinchem et al. | |
| 6,788,292 B1 | 9/2004 | Nako et al. | |
| 6,906,703 B2 | 6/2005 | Vablais et al. | |
| 7,231,609 B2 | 6/2007 | Baudisch | |
| 7,289,102 B2 | 10/2007 | Hinckley et al. | |
| 7,362,221 B2 | 4/2008 | Katz | |
| 7,400,316 B2 | 7/2008 | Appleyard et al. | |
| 7,499,024 B2 | 3/2009 | Johnston, Jr. et al. | |
| 7,532,196 B2 | 5/2009 | Hinckley | |
| 7,567,242 B2 | 7/2009 | Perkins et al. | |
| 7,703,047 B2 | 4/2010 | Keely et al. | |
| 7,812,826 B2 | 10/2010 | Ording et al. | |
| 7,812,828 B2 | 10/2010 | Westerman et al. | |
| 7,847,789 B2 | 12/2010 | Kolmykov-Zotov et al. | |
| 7,956,847 B2 | 6/2011 | Christie | |
| 7,982,739 B2 | 7/2011 | Pasula | |
| 8,228,292 B1 | 7/2012 | Ruiz et al. | |
| 8,265,705 B2 | 9/2012 | Lee | |
| 8,413,077 B2 | 4/2013 | Yamamoto et al. | |
| 2004/0047505 A1 | 3/2004 | Ghassabian | |
| 2004/0073432 A1 | 4/2004 | Stone | |
| 2004/0189594 A1 | 9/2004 | Sterling | |
| 2004/0203520 A1 | 10/2004 | Schirtzinger et al. | |
| 2005/0024346 A1 | 2/2005 | Dupraz et al. | |
| 2005/0052427 A1 * | 3/2005 | Wu et al. | 345/173 |
| 2005/0079896 A1 | 4/2005 | Kokko et al. | |
| 2005/0165839 A1 | 7/2005 | Madan et al. | |
| 2005/0179648 A1 | 8/2005 | Barabe et al. | |
| 2005/0216867 A1 | 9/2005 | Marvit et al. | |
| 2005/0253817 A1 | 11/2005 | Rytivaara et al. | |
| 2006/0012580 A1 | 1/2006 | Perski et al. | |
| 2006/0026535 A1 | 2/2006 | Hotelling et al. | |
| 2006/0109252 A1 | 5/2006 | Kolmykov-Zotov et al. | |
| 2006/0136840 A1 | 6/2006 | Keely, Jr. et al. | |
| 2006/0146038 A1 | 7/2006 | Park et al. | |
| 2006/0197753 A1 | 9/2006 | Hotelling | |
| 2006/0256008 A1 | 11/2006 | Rosenberg | |
| 2006/0267957 A1 | 11/2006 | Kolmykov-Zotov et al. | |
| 2006/0267958 A1 | 11/2006 | Kolmykov-Zotov et al. | |
| 2007/0070051 A1 | 3/2007 | Westerman et al. | |
| 2007/0075965 A1 | 4/2007 | Huppi et al. | |
| 2007/0113198 A1 | 5/2007 | Robertson et al. | |
| 2007/0126732 A1 | 6/2007 | Robertson et al. | |
| 2007/0152976 A1 | 7/2007 | Townsend et al. | |
| 2007/0182663 A1 | 8/2007 | Biech | |
| 2007/0188477 A1 * | 8/2007 | Rehm | 345/179 |
| 2007/0198950 A1 * | 8/2007 | Dodge et al. | 715/815 |
| 2007/0247441 A1 | 10/2007 | Kim et al. | |
| 2007/0268274 A1 | 11/2007 | Westerman et al. | |
| 2008/0002888 A1 | 1/2008 | Yuan | |
| 2008/0012835 A1 | 1/2008 | Rimon et al. | |
| 2008/0040692 A1 | 2/2008 | Sunday et al. | |
| 2008/0046425 A1 * | 2/2008 | Perski | 707/6 |
| 2008/0055278 A1 * | 3/2008 | Locker et al. | 345/179 |
| 2008/0106520 A1 | 5/2008 | Free et al. | |
| 2008/0158145 A1 | 7/2008 | Westerman | |
| 2008/0158168 A1 | 7/2008 | Westerman et al. | |
| 2008/0163130 A1 | 7/2008 | Westerman | |
| 2008/0191898 A1 | 8/2008 | Janik | |
| 2008/0259043 A1 | 10/2008 | Buil et al. | |
| 2008/0292195 A1 | 11/2008 | Vijayasenan et al. | |
| 2009/0100384 A1 | 4/2009 | Louch | |
| 2009/0109182 A1 | 4/2009 | Fyke et al. | |
| 2009/0160816 A1 | 6/2009 | Westerman et al. | |
| 2009/0167702 A1 * | 7/2009 | Nurmi | 345/173 |
| 2009/0178007 A1 | 7/2009 | Matas et al. | |
| 2009/0209285 A1 | 8/2009 | McMahan | |
| 2009/0228842 A1 | 9/2009 | Westerman et al. | |
| 2009/0259969 A1 | 10/2009 | Pallakoff | |
| 2009/0262074 A1 | 10/2009 | Nasiri et al. | |
| 2009/0265671 A1 | 10/2009 | Sachs et al. | |
| 2010/0020025 A1 | 1/2010 | Lemort et al. | |
| 2010/0045705 A1 | 2/2010 | Vertegaal et al. | |
| 2010/0053095 A1 | 3/2010 | Wu et al. | |
| 2010/0053120 A1 | 3/2010 | Chang et al. | |
| 2010/0079493 A1 | 4/2010 | Tse et al. | |
| 2010/0083191 A1 | 4/2010 | Marshall | |
| 2010/0095234 A1 | 4/2010 | Lane et al. | |
| 2010/0103117 A1 * | 4/2010 | Townsend et al. | 345/173 |
| 2010/0103118 A1 | 4/2010 | Townsend et al. | |
| 2010/0123737 A1 | 5/2010 | Williamson et al. | |
| 2010/0127979 A1 | 5/2010 | Lee et al. | |
| 2010/0139990 A1 | 6/2010 | Westerman et al. | |
| 2010/0156941 A1 | 6/2010 | Seung | |
| 2010/0175018 A1 | 7/2010 | Petschnigg et al. | |
| 2010/0177121 A1 | 7/2010 | Homma et al. | |
| 2010/0188328 A1 | 7/2010 | Dodge et al. | |
| 2010/0194547 A1 | 8/2010 | Terrell et al. | |
| 2010/0214216 A1 | 8/2010 | Nasiri et al. | |
| 2010/0235729 A1 | 9/2010 | Kocienda et al. | |
| 2010/0281435 A1 | 11/2010 | Bangalore et al. | |
| 2010/0295781 A1 | 11/2010 | Alameh et al. | |
| 2010/0295799 A1 | 11/2010 | Nicholson et al. | |
| 2010/0298033 A1 | 11/2010 | Lee | |
| 2010/0306670 A1 | 12/2010 | Quinn et al. | |
| 2010/0328227 A1 | 12/2010 | Matejka et al. | |
| 2011/0115741 A1 | 5/2011 | Lukas et al. | |
| 2011/0134026 A1 | 6/2011 | Kang et al. | |
| 2011/0167357 A1 | 7/2011 | Benjamin et al. | |
| 2011/0187651 A1 | 8/2011 | Whitlow et al. | |
| 2011/0193788 A1 | 8/2011 | King et al. | |
| 2011/0197153 A1 | 8/2011 | King et al. | |
| 2011/0221777 A1 | 9/2011 | Ke | |
| 2011/0231796 A1 | 9/2011 | Vigil | |
| 2011/0239110 A1 | 9/2011 | Garrett et al. | |
| 2012/0092268 A1 | 4/2012 | Tsai et al. | |
| 2012/0092269 A1 | 4/2012 | Tsai et al. | |
| 2012/0154294 A1 | 6/2012 | Hinckley et al. | |
| 2012/0158629 A1 | 6/2012 | Hinckley et al. | |
| 2012/0206330 A1 | 8/2012 | Cao et al. | |
| 2012/0242598 A1 * | 9/2012 | Won et al. | 345/173 |
| 2012/0262407 A1 | 10/2012 | Hinckley et al. | |
| 2012/0306927 A1 | 12/2012 | Lee et al. | |
| 2012/0313865 A1 * | 12/2012 | Pearce | 345/173 |
| 2012/0327040 A1 * | 12/2012 | Simon et al. | 345/179 |
| 2012/0327042 A1 * | 12/2012 | Harley et al. | 345/179 |
| 2013/0016055 A1 * | 1/2013 | Chuang | 345/173 |
| 2013/0106725 A1 * | 5/2013 | Bakken et al. | 345/173 |
| 2013/0106740 A1 * | 5/2013 | Yilmaz et al. | 345/173 |
| 2013/0120281 A1 * | 5/2013 | Harris | 345/173 |
| 2013/0181948 A1 | 7/2013 | Sakai | |
| 2013/0335333 A1 | 12/2013 | Kukulski et al. | |
| 2014/0073432 A1 | 3/2014 | Lu et al. | |
| 2014/0108979 A1 * | 4/2014 | Davidson et al. | 715/765 |
| 2014/0210797 A1 * | 7/2014 | Kreek et al. | 345/179 |
| 2014/0253522 A1 * | 9/2014 | Cueto | 345/179 |

OTHER PUBLICATIONS

Figueroa-Gibson, Gloryvid, U.S. Notice of Allowance, U.S. Appl. No. 12/970,939, filed Dec. 19, 2014, pp. 1-10.

Figueroa-Gibson, Gloryvid, U.S. Final Office Action, U.S. Appl. No. 12/970,949, filed Aug. 15, 2014, pp. 1-21.

Figueroa-Gibson, Gloryvid, U.S. Office Action, U.S. Appl. No. 12/970,943, filed Sep. 17, 2014, pp. 1-20.

Figueroa-Gibson, Gloryvid, U.S. Office Action, U.S. Appl. No. 12/970,939, filed Oct. 2, 2014, pp. 1-40.

Figueroa-Gibson, G., U.S. Office Action, U.S. Appl. No. 12/970,943, filed Nov. 6, 2013.

Traktovenko, Ilya, U.S. Notice of Allowance, U.S. Appl. No. 12/970,945, filed Oct. 16, 2013.

Traktovenko, Ilya, U.S. Final Office Action, U.S. Appl. No. 13/530,015, filed Nov. 19, 2014, pp. 1-48.

Zhou, Hong, Notice of Allowance, U.S. Appl. No. 13/026,058, filed Nov. 7, 2014, pp. 1-5.

Treitler, Damon, U.S. Final Office Action, U.S. Appl. No. 13/327,794, filed Nov. 20, 2014, pp. 1-13.

(56) References Cited

OTHER PUBLICATIONS

Geisy, Adam, Notice of Allowance, U.S. Appl. No. 13/367,377, filed Oct. 27, 2014, pp. 1-10.
Figueroa-Gibson, Gloryvid, U.S. Final Office Action, U.S. Appl. No. 12/970,949, filed Nov. 29, 2013, pp. 1-29.
Figueroa-Gibson, Gloryvid, U.S. Office Action, U.S. Appl. No. 12/970,943, filed Mar. 13, 2014, pp. 1-25.
Figueroa-Gibson, Gloryvid, U.S. Office Action, U.S. Appl. No. 12/970,939, filed Dec. 19, 2013, pp. 1-28.
Zhou, Hong, U.S. Final Office Action, U.S. Appl. No. 13/026,058, filed Feb. 26, 2014, pp. 1-14.
Treitler, Damon , U.S. Final Office Action, U.S. Appl. No. 13/327,794, filed Dec. 19, 2013, pp. 1-16.
Ashbrook, et al., "Magic: A Motion Gesture Design Tool," retrieved at <<http://research.nokia.com/files/2010-Ashbrook-CHI10-MAGIC.pdf>>, Proccedings of the 28th International Conference on Human Factors in Computing Systems, Apr. 2010, 10 pages.
Babyak, Richard, "Controls & Sensors: Touch Tones", retrieved at <<http://www.appliancedesign.com/Articles/Controls_and_Displays/BNP_GUID_9-5-2006_A_100000000000000129366>>, Appliance Design, Jun. 30, 2007, 5 pages.
Bao, et al., "Effect of Tilt Angle of Tablet on Pen-based Input Operation Based on Fitts' Law", Proceedings of the 2010 IEEE International Conference on Information and Automation, Jun. 2010, pp. 99-104.
Bartlett, Joel F., "Rock 'n' Scroll Is Here to Stay," accessed at <<http://www.hpl.hp.com/techreports/Compaq-DEC/WRL-2000-3.pdf>>, Western Research Laboratory, Palo Alto, California, May 2000, 9 pages.
Bjørneseth, et al., "Dynamic Positioning Systems—Usability and Interaction Styles," retrieved at http://www.ceng.metu.edu.tr/~tcan/se705_s0809/Schedule/assignment3.pdf>>, Proceedings of the 5th Nordic Conference on Human-Computer Interaction: Building Bridges, Oct. 2008, 10 pages.
Buxton, William, "Chunking and Phrasing the Design of Human-Computer Dialogues," retrieved at <<http://www.billbuxton.com/chunking.pdf>>, Proceedings of the IFIP World Computer Congress, Sep. 1986, 9 pages.
Buxton, William, "Lexical and Pragmatic Considerations of Input Structure," retreived at <<http://acm.org>>, ACM SIGGRAPH Computer Graphics, vol. 17, Issue 1, Jan. 1983, pp. 31-37.
Chen, et al., "Navigation Techniques for Dual-Display E-Book Readers," retrieved at <<http://acm.org>>, CHI '08 Proceeding of the Twenty-Sixth Annual SIGCHI Conference on Human Factors in Computing Systems, Apr. 2008, pp. 1779-1788.
Cho, et al., "Multi-Context Photo Browsing on Mobile Devices Based on Tilt Dynamics," retrieved at <<http://acm.org>>, MobileHCI '07 Proceedings of the 9th International Conference on Human Computer Interaction with Mibile Devices and Services, Sep. 2007, pp. 190-197.
Chun, et al., "Virtual Shelves: Interactions with Orientation-Aware Devices," retrieved at <<http://acm.org>>, UIST'09, Oct. 2009, pp. 125-128.
Cohen, et al., "Synergistic Use of Direct Manipulation and Natural Language," retrieved at <<http://acm.org, CHI '89 Proceedings of the SIGCHI Conference on Human Factors in Computing Systems, Apr. 1989, pp. 227-233.
Dachselt, et al., "Throw and Tilt—Seamless Interaction Across Devices Using Mobile Phone Gestures", Proceedings of the 34th Graphics Interface Conference, May 2008, 7 pages.
Döring, et al., "Exploring Gesture-Based Interaction Techniques in Multi-Display Environments with Mobile Phones and a Multi-Touch Table", Proceedings of the Workshop on Coupled Display Visual Interfaces, May 25, 2010, pp. 47-54.
"DuoSense Pen, Touch & Multi-Touch Digitizer," retrieved at http://www.n-trig.com/Data/Uploads/Misc/DuoSense_Brochure_FINAL.pdf, May 2008, N-trig Ltd., Kfar Saba, Israel, 4 pages.

Edge, et al., "Bimanual Tangible Interaction with Mobile Phones," retrieved at <<http://research.microsoft.com/en-us/people/daedge/edgeteibimanual2009.pdf>>, Proceedings of the 3rd International Conference on Tangible and Embedded Interaction, Feb. 2009, pp. 131-136.
Eslambolchilar, et al., "Tilt-Based Automatic Zooming and Scaling in Mobile Devices—a state-space implementation." retrieved at <<http://www.dcs.gla.ac.uk/~rod/publications/EsIMur04-SDAZ.pdf>>, Proceedings of Mobile HCI2004: 6th International Conference on Human Computer Interaction with Mobile Devices, Springer, Sep. 2004, 12 pages.
Essl, et al., "Use the Force (or something)—Pressure and Pressure-Like Input for Mobile Music Performance," retrieved at <<http://www.deutsche-telekom-laboratories.de/~rohs/papers/Essl-ForceMusic.pdf>>, NIME 2010 Conference on New Interfaces for Musical Expression, Jun. 2010, 4 pages.
Harrison, et al., "Scratch Input: Creating Large, Inexpensive, Unpowered and Mobile Finger Input Surfaces," retrieved at <<http://acm.org>>, UIST '08 Proceedings of the 21st Annual ACM Symposium on User interface Software and Technology, Oct. 2008, pp. 205-208.
Harrison, et al., "Skinput: Appropriating the Body as an Input Surface," retrieved at <<http://acm.org>>, CHI '10 Proceedings of the 28th International Conference on Human Factors in Computing Systems, Apr. 2010, pp. 453-462.
Hassan, et al., "Chucking: A One-Handed Document Sharing Technique," T. Gross et al. (Eds.): INTERACT 2009, Part II, LNCS 5727, Aug. 2009, pp. 264-278.
Herot, et al., "One-Point Touch Input of Vector Information from Computer Displays," retrieved at <<http://acm.org>>, SIGGRAPH '78 Proceedings of the 5th Annual Conference on Computer Graphics and Interactive Techniques, 12(3), Aug. 1978, pp. 210-216.
Hinckley, et al., "Design and Analysis of Delimiters for Selection-Action Pen Gesture Phrases in Scriboli," retrieved at <<http://acm.org>>, CHI '05 Proceedings of the SIGCHI Conference on Human Factors in Computing Systems, Apr. 2005, pp. 451-460.
Hinckley, et al., "Foreground and Background Interaction with Sensor-Enhanced Mobile Devices," retrieved at <<http://research.microsoft.com/en-us/um/people/kenh/papers/tochisensing.pdf>>, ACM Transactions on Computer-Human Interaction, vol. 12, No. 1, Mar. 2005, 22 pages.
Hinckley, et al., "Manual Deskterity: An Exploration of Simultaneous Pen + Touch Direct Input," retrieved at <<http://acm.org>>, CHI EA '10 Proceedings of the 28th of the International Conference, Extended Abstracts on Human Factors in Computing Systems, Apr. 2010, pp. 2793-2802.
Iwasaki, et al., "Expressive Typing: A New Way to Sense Typing Pressure and Its Applications," retrieved at <<http://acm.org>>, CHI '09 Proceedings of the 27th International Conference Extended Abstracts on Human Factors in Computing Systems, Apr. 2009, pp. 4369-4374.
Izadi, et al., "C-Slate: A Multi-Touch and Object Recognition System for Remote Collaboration using Horizontal Surfaces", Second Annual IEEE International Workshop on Horizontal Interactive Human-Computer System, Oct. 2007, pp. 3-10.
Joselli et al., "GRMOBILE—A Framework for touch and accelerometer gesture recognition for mobile", Proceedings of the 2009 VIII Brazilian Symposium on Games and Digital Entertainment, Oct. 2009, pp. 141-150.
Joshi, et al., "Image Deblurring Using Inertial Measurement Sensors," retrieved at <<http://acm.org>>, ACM Transactions on Graphics, vol. 29, No. 4, Article 30, Jul. 2010, 9 pages.
Kendrick, "ChromeTouch: Free Extension for Touch Tables", GigaOM, May 6, 2010, 9 pages.
Kratz, et al., "Unravelling Seams: Improving Mobile Gesture Recognition with Visual Feedback Techniques," retrieved at <<http://acm.org>>, CHI '09 Proceedings of the 27th International Conference on Human Factors in Computing Systems, Apr. 2009, pp. 937-940.
Liao, et al., "PACER: Fine-grained Interactive Paper via Camera-touch Hybrid Gestures on a Cell Phone," retrieved at <<http://acm.org>>, CHI '10 Proceedings of the 28th International Conference on human Factors in Computing Systems, Apr. 2010, pp. 2441-2450.

(56) References Cited

OTHER PUBLICATIONS

Malacria, et al., "Clutch-Free Panning and Integrated Pan-Zoom Control on Touch-Sensitive Surfaces: The CycloStar Approach," retrieved at <<http://www.malacria.fr/data/doc/pdf/cyclostar.pdf>>, Proceedings of the 28th International Conference on Human Factors in Computing Systems, Apr. 2010, 10 pages.

Mohamed, et al., "Disoriented Pen-Gestures for Identifying Users Around the Tabletop Without Cameras and Motion Sensors", Proceedings of the First IEEE International Workshop on Horizontal Interactive Human-Computer Systems (TABLETOP '06), Jan. 2006, 8 pages.

Mulroy, "N-Trig Pushes Pen and Multitouch Input", PC world, Retrieved on Jan. 27, 2011 at <<http://www.pcworld.com/artice/196723/ntrig_pushes_pen_and_multitouch_input.html>>, May 19, 2010, 3 pages.

N-act Multi-Touch Gesture Vocabulary Set, retrieved date, Oct. 12, 2011, 1 page.

Oviatt, et al., "Toward a Theory of Organized Multimodal Integration Patterns during Human-Computer Interaction," retrieved at <<http://acm.org>>, ICMI '03 Proceedings of the 5th International Conference on Multimodal Interfaces, Nov. 2003, pp. 44-51.

Partridge, et al., "TiltType: Accelerometer-Supported Text Entry for Very Small Devices," retrieved at http://acm.org>>, UIST '02 Proceedings of the 15th Annual ACM Symposium on User Interface Software and Technology, Oct. 2002, pp. 201-204.

"PenLab: Itronix GoBook Duo-Touch," retrieved at <<http://pencomputing.com/frames/itronix_duotouch.html>>, retrieved on Jan. 31, 2012, Pen Computing magazine, 3 pages.

Rahman, et al., "Tilt Techniques: Investigating the Dexterity of Wrist-based Input," retrieved at <<http://acm.org>>, CHI '09 Proceedings of the 27th international Conference on Human Factors in Computing Systems, Apr. 2009, pp. 1943-1952.

"Samsung Exhibit II 4G review: Second time around," retrieved at <<http://www.gsmarena.com/samsung_exhibit_2_4g-review-685p5.php>>, GSNArena.com, Dec. 1, 2011, p. 5 of online article, 3 pages.

Schwarz, et al., "A Framework for Robust and Flexible Handling of Inputs with Uncertainty," retrieved at <<http://acm.org>>, UIST '10, Proceedings of the 23nd Annual ACM Symposium on User Interface Software and Technology, Oct. 2010, pp. 47-56.

Schwesig, et al., "Gummi: A Bendable Computer," retrieved at <<http://acm.org>>, CHI '04, Proceedings of the SIGCHI Conference on Human Factors in Computing Systems, Apr. 2004, pp. 263-270.

Sellen, et al., "The Prevention of Mode Errors through Sensory Feedback," retrieved at <<http://acm.org>>, Journal of Human-Computer Interaction, vol. 7, Issue 2, Jun. 1992, pp. 141-164.

Thurott, Paul, "Windows XP Tablet Pc Edition reviewed", Paul Thurrott's Supersite for Windows, Jun. 25, 2002, 7 pages.

"TouchPaint.java", The Android Open Source Project, 2007.

"Using Windows Flip 3D", retrieved at <<http://windows.microsoft.com/en-US/windows-vista/Using-Windows-Flip-3D>>, retrieved on Feb. 9, 2012, Microsoft Corporation, Redmond, WA, 1 page.

Walker, Geoff, "Palm rejection on resistive touchscreens", Veritas et Visus, Nov. 2005, pp. 31-33.

Wigdor, et al., "Lucid-Touch: A See-through Mobile Device," Proceedings of the 20th Annual ACM Symposium on User Interface Software and Technology, Oct. 2007, pp. 269-278.

Wigdor, et al., "TiltText:Using Tilt for Text Input to Mobile Phones," retrieved at <<http://acm.org>>, UIST '03, Proceedings of the 16th Annual ACM Symposium on User Interface Software and Technology, Nov. 2003, pp. 81-90.

Williamson, et al., "Shoogle: Excitatory Multimodal Interaction on Mobile Devices," retrieved at <<http://acm.org>>, CHI '07, Proceedings of the SIGCHI Conference on Human factors in Computing Systems, Apr. 2007, pp. 121-124.

Ilya Traktovenko, U.S. Office Action, U.S. Appl. No. 12/970,945, filed Apr. 22, 2013.

Figueroa-Gibson, G., U.S. Office Action, U.S. Appl. No. 12/970,939, filed Jun. 5, 2013.

Figueroa-Gibson, G., U.S. Office Action, U.S. Appl. No. 12/970,939, filed Aug. 22, 2013.

Figueroa-Gibson, G., U.S. Office Action, U.S. Appl. No. 12/970,943, filed Jun. 10, 2013.

Figueroa-Gibson, G., U.S. Office Action, U.S. Appl. No. 12/970,949, filed Jun. 21, 2013.

Treitler, D., U.S. Office Action, U.S. Appl. No. 13/327,794, filed Aug. 16, 2013.

Traktovenko, Ilya, U.S. Notice of Allowance, U.S. Appl. No. 12/970,945, filed Jul. 10, 2013.

Geisy, Adam, U.S. Final Office Action, U.S. Appl. No. 13/367,377, filed Jul. 1, 2014, pp. 1-12.

Traktovenko, Ilya, U.S. Office Action, U.S. Appl. No. 13/530,015, filed Jul. 18, 2014, pp. 1-26.

Zhou, Hong, Notice of Allowance, U.S. Appl. No. 13/026,058, filed Jul. 17, 2014, pp. 1-5.

Treitler, Damon, U.S. Office Action, U.S. Appl. No. 13/327,794, filed Jul. 17, 2014, pp. 1-13.

Balakrishnan, et al., Digital tape drawing, Proceedings of the 12th Annual ACM Symposium on User Interface Software and Technology, ACm Symposium on User Interface Software and Technology, UIST '99, Nov. 7-10, 1999, pp. 161-169, Asheville, USA.

Brandl, et al., "Occlusion-aware menu design for digital tabletops", Proc. of the 27th Int'l Conf. on Human Factors in Computing Systems, CHI 2009, Extended Abstracts, Apr. 4-9, 2009, pp. 3223-3228, Boston, MA, USA.

Buxton, W., "Integrating the Periphery and Context: A New Model of Telematics Proceedings of Graphics Interface", 1995, pp. 239-246.

Chu, et al., "Detail-preserving paint modeling for 3D brushes", Proc. of the 8th Int'l Symposium on Non-Photorealistic Animation and Rendering 2010, NPAR 2010, Jun. 7-10, 2010, pp. 27-34, Annecy, France.

Fitzmaurice, et al., "An Exploration into Supporting Artwork Orientation in the User Interface", Proc. of the CHI '99 Conf. on Human Factors in Computing Sys's: The CHI is the Limit, Pittsburgh, CHI 1999, May 15-20, 1999, pp. 167-174.

Guiard, et al., "Writing Postures in Left-Handers: Inverters are Hand-Crossers", Neuropsychologia, Mar. 1984, pp. 535-538, vol. 22, No. 4.

Hinckley, et al., "Codex: A dual screen tablet computer", Proc. of the 27th Int'l Conf. on Human Factors in Computing Sys's, CHI 2009, Apr. 4-9, 2009, pp. 1933-1942, Boston, MA, USA.

Kurtenbach, et al., "The design of a GUI paradigm based on tablets, two-hands, and transparency", Proceedings of the ACM SIGCHI Conference on Human factors in computing systems, CHI 1997, Mar. 1997, pp. 35-42.

Lee, et al., "HandSCAPE: A vectorizing tape measure for on-site measuring applications", Proceedings of the CHI 2000 Conference on Human factors in computing systems, CHI 2000, Apr. 1-6, 2000, pp. 137-144, The Hague, The Netherlands.

Luff, et al., Mobility in Collaboration, Proceedings of the ACM 1998 Conference on Computer Supported Cooperative Work, CSCW 1998, Nov. 14-18, 1998, pp. 305-314, Seattle, WA, USA.

Mahony, et al., Nonlinear Complementary Filters on the Special Orthogonal Group, IEEE Trans. Automat. Contr., 2008, pp. 1203-1218, vol. 53, No. 5.

Mason, et al., "Grip Forces When Passing an Object to a Partner", Exp. Brain Res., May 2005, vol. 163, No. 2, pp. 173-187.

Premerlani, et al., Direction Cosine Matrix IMU: Theory, retrieved from gentlenav.googlecode.com/files/DCMDraft2.pdf, May 2009, pp. 1-30.

Silo, et al., "Mobile Interaction Using Paperweight Metaphor", Proc. of the 19th Annual ACM Symposium on User Interface Software and Technology, UIST '06, Oct. 2006, pp. 111-114, Montreux, Switzerland.

Wimmer, et al., HandSense: Discriminating Different Ways of Grasping and Holding a Tangible User Interface, Proceedings of the 3rd International Conference on Tangible and Embedded Interaction, TEI '09, Feb. 2009, pp. 359-362, Cambridge, UK.

Figueroa-Gibson, Gloryvid, U.S. Office Action, U.S. Appl. No. 12/970,949, filed Mar. 13, 2014, pp. 1-29.

Figueroa-Gibson, Gloryvid, U.S. Final Office Action, U.S. Appl. No. 12/970,939, filed May 30, 2014, pp. 1-32.

(56) References Cited

OTHER PUBLICATIONS

Geisy, Adam, U.S. Office Action, U.S. Appl. No. 13/367,377, filed Feb. 13, 2014, pp. 1-11.
Aliakseyeu, D., A. Lucero, S. Subramanian, Interacting with piles of artifacts on digital tables, Digital Creativity, Jul. 2007, pp. 161-174, vol. 18, No. 3.
Balakrishnan, et al., "The Rockin'Mouse: Integral 3D Manipulation on a Plane", In Proceedings of the ACM SIGCHI Conference on Human Factors in Computing Systems, Mar. 22, 1997, 8 pages.
Bi, et al., "An Exploration of Pen Rolling for Pen-Based Interaction", In Proceedings of the 21st Annual ACM Symposium on User Interface Software and Technology, Oct. 19, 2008, 10 pages.
Brandl, et al., "Combining and Measuring the Benefits of Bimanual Pen and Direct-Touch Interaction on Horizontal Interfaces", In Proceedings of the Working Conference on Advanced Visual Interfaces, May 28, 2008, 10 pages.
Buxton, William A.S., "A Three-State Model of Graphical Input", In Proceedings of the IFIP TC13 Third Interational Conference on Human-Computer Interaction, Aug. 27, 1990, 11 pages.
Card, S. K., J. D. MacKinlay, G. G. Robertson, The design space of input devices, CHI 1990, Apr. 1990, pp. 117-124, Seattle, WA, USA.
Fitzmaurice, et al., "Tracking Menus", In Proceedings of the 16th Annual ACM Symposium on User Interface Software and Technology, Nov. 2, 2003, 10 pages.
Frisch, et al., "Investigating Multi-Touch and Pen Gestures for Diagram Editing on Interactive Surfaces", In ACM International Conference on Interactive Tabletops and Surfaces, Nov. 23, 2009, 8 pages.
Goel, et al., "WalkType: Using Accelerometer Data to Accomodate Situational Impairments in Mobile Touch Screen Text Entry", In Proceedings of the SIGCHI Conference on Human Factors in Computing Systems, May 5, 2012, 10 pages.
Goel, et al., "GripSense: Using Built-In Sensors to Detect Hand Posture and Pressure on Commodity Mobile Phones", In Proceedings of the 25th Annual ACM Symposium on User Interface Software and Technology, Oct. 7, 2012, 10 pages.
Grossman, et al., "Hover Widgets: Using the Tracking State to Extend the Capabilities of Pen-Operated Devices", In Proceedings of the SIGCHI Conference on Human Factors in Computing Systems, Apr. 22, 2006, 10 pages.
Harrison, et al., "Squeeze Me, Hold Me, Tilt Me! An Exploration of Manipulative User Interfaces", In Proceedings of the SIGCHI Conference on Human Factors in Computing Systems, Apr. 18, 1998, 8 pages.
Hasan, et al., "A-Coord Input: Coordinating Auxiliary Input Streams for Augmenting Contextual Pen-Based Interactions", In Proceedings of the SIGCHI Conference on Human Factors in Computing Systems, May 5, 2012, 10 pages.
Hinckley, Ken, "Synchronous Gestures for Multiple Persons and Computers", In Proceedings of the 16th Annual ACM Symposium on User Interface Software and Technology, Nov. 2, 2003, 10 pages.
Hinckley, et al., "Sensing Techniques for Mobile Interaction", In Proceedings of the 13th Annual ACM Symposium on User Interface Software and Technology, Nov. 5, 2000, 10 pages.
Hinckley, et al., "Touch-Sensing Input Devices", In Proceedings of the SIGCHI Conference on Human Factors in Computing Systems, May 15, 1999, 8 pages.
Hinckley, et al., "Direct Display Interaction via Simultaneous Pen + Multi-touch Input", In Society for Information Display (SID) Symposium Digest of Technical Papers, May 2010, 4 pages.
Hinckley, et al., "Sensor Synaesthesia: Touch in Motion, and Motion in Touch", In Proceedings of the SIGCHI Conference on Human Factors in Computing Systems, May 7, 2011, 10 pages.
Hinckley, et al., "Pen + Touch = New Tools", In Proceedings of the 23nd Annual ACM Symposium on User Interface Software and Technology, Oct. 3, 2010, 10 pages.
Holmquist, et al., "Smart-Its Friends: A Technique for Users to Easily Establish Connections between Smart Artefacts", In Proceedings of the 3rd International Conference on Ubiquitous Computing, Sep. 30, 2001, 6 pages.
Hudson, et al., "Whack Gestures: Inexact and Inattentive Interaction with Mobile Devices", In Proceedings of the Fourth International Conference on Tangible, Embedded, and Embodied Interaction, Jan. 25, 2010, 4 pages.
Kim, et al., "Hand Grip Pattern Recognition for Mobile User Interfaces", In Proceedings of the 18th Conference on Innovative Applications of Artificial Intelligence, vol. 2, Jul. 16, 2006, 6 pages.
Kurtenbach, et al., "Issues in Combining Marking and Direct Manipulation Techniques", In Proceedings of the 4th Annual ACM Symposium on User Interface Software and Technology, Nov. 11, 1991, 8 pages.
Lester, et al., ""Are You With Me?"—Using Accelerometers to Determine if Two Devices are Carried by the Same Person", In Proceedings of Second International Conference on Pervasive Computing, Apr. 21, 2004, 18 pages.
Li, et al., "Experimental Analysis of Mode Switching Techniques in Pen-Based User Interfaces", In Proceedings of the SIGCHI Conference on Human Factors in Computing Systems, Apr. 2, 2005, 10 pages.
Li, et al., "The 1Line Keyboard: A QWERTY Layout in a Single Line", In Proceedings of the 24th Annual ACM Symposium on User Interface Software and Technology, Oct. 16, 2011, 10 pages.
Ramos, et al., "Pressure Widgets", In Proceedings of the SIGCHI Conference on Human Factors in Computing Systems, vol. 6, Issue 1, Apr. 24, 2004, 8 pages.
Ramos, et al., "Tumble! Splat! Helping Users Access and Manipulate Occluded Content in 2D Drawings", In Proceedings of the Working Conference on Advanced Visual Interfaces, May 23, 2006, 8 pages.
Rekimoto, Jun, "Tilting Operations for Small Screen Interfaces", In Proceedings of the 9th Annual ACM Symposium on User Interface Software and Technology, Nov. 6, 1996, 2 pages.
Rofouei, et al., "Your Phone or Mine? Fusing Body, Touch and Device Sensing for Multi-User Device-Display Interaction", In Proceedings of the SIGCHI Conference on Human Factors in Computing Systems, May 5, 2012, 4 pages.
Roudaut, et al., "TimeTilt: Using Sensor-Based Gestures to Travel through Multiple Applications on a Mobile Device", In Proceedings of the 12th IFIP TC 13 International Conference on Human-Computer Interaction: Part I, Aug. 24, 2009, 5 pages.
Ruiz, et al., "DoubleFlip: A Motion Gesture Delimiter for Mobile Interaction", In Proceedings of the SIGCHI Conference on Human Factors in Computing Systems, May 7, 2011, 4 pages.
Ruiz, et al., "User-Defined Motion Gestures for Mobile Interaction", In Proceedings of the SIGCHI Conference on Human Factors in Computing Systems, May 7, 2011, 10 pages.
Sachs, et al., "3-Draw: A Tool for Designing 3D Shapes", In Journal of IEEE Computer Graphics and Applications, vol. 11, Issue 6, Nov. 1991, 9 pages.
Schmidt, et al., "Advanced Interaction in Context", In Proceedings of the 1st International Symposium on Handheld and Ubiquitous Computing, Sep. 27, 1999, 13 pages.
Schmidt, et al., "PhoneTouch: A Technique for Direct Phone Interaction on Surfaces", In Proceedings of the 23nd Annual ACM Symposium on User Interface Software and Technology, Oct. 3, 2010, 4 pages.
Subramanian, et al., "Multi-layer interaction for digital tables," In Proc. of the 19th Annual ACM Symposium on User Interface Software and Technology, Oct. 15, 2006, pp. 269-272.
Sun, et al., "Enhancing Naturalness of Pen-and-Tablet Drawing through Context Sensing", In Proceedings of the ACM International Conference on Interactive Tabletops and Surfaces, Nov. 13, 2011, 4 pages.
Suzuki, et al., "Stylus Enhancement to Enrich Interaction with Computers", In Proceedings of the 12th International Conference on Human-Computer Interaction: Interaction Platforms and Techniques, Jul. 22, 2007, 10 pages.
Tashman, et al., "LiquidText: A Flexible, Multitouch Environment to Support Active Reading", In Proceedings of the SIGCHI Conference on Human Factors in Computing Systems, May 7, 2011, 10 pages.
Taylor, et al., "Graspables: Grasp-Recognition as a User Interface", In Proceedings of the 27th International Conference on Human Factors in Computing Systems, Apr. 4, 2008, 9 pages.

(56) References Cited

OTHER PUBLICATIONS

Tian, et al., "The Tilt Cursor: Enhancing Stimulus-Response Compatibility by Providing 3D Orientation Cue of Pen", In Proceedings of the SIGCHI Conference on Human Factors in Computing Systems, Apr. 28, 2007, 4 pages.

Tian, et al., "Tilt Menu: Using the 3D Orientation Information of Pen Devices to Extend the Selection Capability of Pen-based User Interfaces", In Proceedings of the SIGCHI Conference on Human Factors in Computing Systems, Apr. 5, 2008, 10 pages.

Verplaetse, C., "Inertial Proprioceptive Devices: Self-Motion-Sensing Toys and Tools", In IBM Systems Journal, vol. 35, Issue 3-4, Apr. 23, 2013, 12 pages.

Vogel, et al., "Conte: Multimodal Input Inspired by an Artist's Crayon", In Proceedings of the 24th Annual ACM Symposium on User Interface Software and Technology, Oct. 16, 2011, 10 pages.

Wilson, et al., "XWand: UI for Intelligent Spaces", In Proceedings of the SIGCHI Conference on Human Factors in Computing Systems, Apr. 5, 2003, 8 pages.

Wu, et al., "Gesture Registration, Relaxation, and Reuse for Multi-Point Direct-Touch Surfaces", In Proceedings of the First IEEE International Workshop on Horizontal Interactive Human-Computer Systems, Jan. 5, 2006, 8 pages.

Xin, et al., "Acquiring and Pointing: An Empirical Study of Pen-Tilt-Based Interaction", In Proceedings of the SIGCHI Conference on Human Factors in Computing Systems, May 7, 2011, 10 pages.

Xin, et al., "Natural Use Profiles for the Pen: An Empirical Exploration of Pressure, Tilt, and Azimut", In Proceedings of the SIGCHI Conference on Human Factors in Computing Systems, May 5, 2012, 4 pages.

Yee, Ka-Ping, "Two-Handed Interaction on a Tablet Display", In Proceedings of Extended Abstracts on Human Factors in Computing Systems, Apr. 24, 2004, 4 pages.

Traktovenko, Ilya, U.S. Office Action, U.S. Appl. No. 13/530,015, filed Apr. 28, 2015, pp. 1-32.

Figueroa-Gibson, Gloryvid, U.S. Office Action, U.S. Appl. No. 12/970,949, filed Jan. 2, 2015, pp. 1-24.

Figlieroa-Gibson, Gloryvid, U.S. Final Office Action, U.S. Appl. No. 12/970,949, filed Jun. 10, 2015, pp. 1-25.

Zeleznik, et al., "Hands-On Math: A Page-Based Multi-Touch and Pen Desktop for Technical Work and Problem Solving", In Proceedings of the 23nd Annual ACM Symposium on User Interface Software and Technology, Oct. 3, 2010, 10 pages.

McLoone, Peter D., U.S. Office Action, U.S. Appl. No. 14/303,234, Oct. 15, 2015, pp. 1-16.

* cited by examiner

MOTION AND CONTEXT SHARING FOR PEN-BASED COMPUTING INPUTS

CROSS-REFERENCE TO RELATED APPLICATIONS

This application is a Continuation-in-Part of a prior application entitled "MULTI-TOUCH INPUT DEVICE WITH ORIENTATION" by Xiang Cao, et al., which was filed with the USPTO on Feb. 11, 2011 and assigned Ser. No. 13/026,058, the subject matter of which is incorporated herein by this reference.

BACKGROUND

Many mobile computing devices (e.g., tablets, phones, etc.) use a pen, pointer, or stylus type input device (collectively referred to herein as a "pen type input device" or "pen") in combination with a digitizer component of the computing device for input purposes. Typically, pen type input devices enable a variety of multi-modal pen, touch, and motion based input techniques.

Various conventional input techniques have adapted pen type devices to provide auxiliary input channels including various combinations of tilting, rolling, and pressure sensing. However, one of the limitations of many of these techniques is that they operate using sensors coupled to the computing device to sense and consider pen movements or hover conditions that are required to be in close proximity to the digitizer so that the pen can be sensed by the digitizer. Many such techniques operate in a context where the pen is used to perform various input actions that are then sensed and interpreted by the computing device.

For example, one conventional technique considers pen rolling during handwriting and sketching tasks, as well as various intentional pen rolling gestures. However, these pen rolling techniques operate in close proximity to the computing device based on sensors associated with the computing device. Related techniques that require the pen type input device to maintain contact (or extreme proximity) with the digitizer include various tilt and pressure based pen inputs. Various examples of such techniques consider separate or combined tilt and pressure inputs in various tablet-based settings for interacting with context menus, providing multi-parameter selection, object or menu manipulation, widget control, etc.

In contrast, various conventional techniques use an accelerometer-enhanced pen to sense movements when the pen or stylus is not touching the display. The sensed movements are then provided to the computing device for input purposes such as shaking the stylus to cycle through color palettes, and rolling the stylus to pick colors or scroll web pages. A somewhat related technique provides a pointing device having multiple inertial sensors to enable three-dimensional pointing in a "smart room" environment. This technique enables a user to gesture to objects in the room and speak voice commands. Other techniques use 3D spatial input to employ stylus-like devices in free space, but require absolute tracking technologies that are generally impractical for mobile pen-and-tablet type interactions.

Recently various techniques involving the use of contact (touch) sensors or multi-contact pressure (non-zero force) sensors on a pen surface have been used to enable various grip-sensing input scenarios. For example, stylus barrels have been developed to provide multi-touch capabilities for sensing finger gestures. Specific grips can also be associated with particular pens or brushes. Several conventional systems employ inertial sensors in tandem with grip sensing to boost grip pattern recognition.

Further, various conventional systems combine pen tilt with direct-touch input. One such system uses a stylus that senses which corners, edges, or sides of the stylus come into contact with a tabletop display. Thus, by tilting or rolling the stylus while it remains in contact with the display, the user can fluidly switch between a number of tools, modes, and other input controls. This system also combines direct multi-touch input with stylus orientation, allowing users to tap a finger on a control while holding or "tucking" the stylus in the palm. However, this system requires contact with the display in order to sense tilt or other motions. Related techniques combine both touch and motion for mobile devices by using direct touch to cue the system to recognize shaking and other motions of pen type input devices.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of prior technologies may be noted or discussed herein, the claimed subject matter is not intended to be limited to implementations that may solve or address any or all of the disadvantages of those prior technologies.

In general, a "Motion and Context Sharing Technique," as described herein, provides a variety of input techniques based on various combinations of pen input, direct-touch input, and motion-sensing inputs. In contrast to existing pen based input techniques, the Motion and Context Sharing Techniques described herein leverage inputs from some or all of the sensors of a "sensor pen" in combination with displays or other surfaces that support both pen or stylus inputs and direct multi-touch input. In other words, various embodiments of the Motion and Context Sharing Technique consider various combinations of pen stroke, pressure, motion, and other inputs in the context of touch-sensitive displays, in combination with various hybrid techniques that incorporate simultaneous, concurrent, sequential, and/or interleaved, sensor pen inputs and touch inputs (i.e., finger, palm, hand, etc.) on the display or other touch sensitive surface of the computing device.

Note that the term pressure, as relating to pressure sensors and the like may refer to various sensor types and configurations. For example, in various cases and embodiments, pressure may refer to pen tip pressure exerted on a display. In general, pen tip pressure is typically sensed by some type of pressure transducer inside the pen, but it is also possible to have the pen tip pressure sensing done by the display/digitizer itself in some devices. In addition, the term pressure or pressure sensing or the like may also refer to a separate channel of sensing the grip pressure of the hand (or fingers) contacting an exterior casing or surface of the pen. Various sensing modalities employed by the Motion and Context Sharing Technique may separately or concurrently consider or employ both types of pressure sensing (i.e., pen tip pressure and pen grip pressure) for initiating various motion gestures.

Note that various devices used to enable some of the many embodiments of a "Motion and Context Sharing Technique," as described herein, include pens, pointers, stylus type input devices, etc., that are collectively referred to herein as a "sensor pen" for purposes of discussion. Note also that the functionality described herein may be implemented in any desired form factor, e.g., wand, staff, ball racquet, toy sword, etc., for use with various gaming devices, gaming consoles, or other computing devices. Further, the sensor pens described herein are adapted to incorporate various combinations of a power supply and multiple sensors including, but not limited to inertial sensors, accelerometers, pressure sensors, grip sensors, near-field communication sensors, RFID tags and/or sensors, temperature sensors, microphones, magnetometers, capacitive sensors, gyroscopes, etc., in combination with various wireless communications capabilities for interfacing with various computing devices. In addition, in various embodiments, the sensor pens described herein have been further adapted to incorporate digital memory and/or computing capabilities that allow the sensor pens to act in combination or cooperation with other computing devices, other sensor pens, or even as a standalone computing device.

Advantageously, the various embodiments of the Motion and Context Sharing Technique described herein use various wired and/or wireless communication techniques integrated into the sensor pen to enable inputs and gestures that are not restricted to a near-proximity sensing range of the digitizer of the computing device. In addition, another advantage of the Motion and Context Sharing Technique described herein is that the use of a wide range of sensors and a communication interface in the sensor pen enables a wide array of sensing dimensions that provide new input scenarios and gestures for computing devices. Examples input scenarios include, but are not limited to, using electronically active sensor pens for tablets, electronic whiteboards, or other direct-input devices since the sensor pen itself integrates motion and/or grip-sensing and other sensor-based capabilities that allow richer in-air pen-based gestures at arbitrary distances from the computing device, as well as richer sensing of user context information.

Further, these capabilities enable realization of a wide range of new pen-based gestures and input scenarios, many of which are simply not supported by conventional tablet-digitizer technologies due to the necessity of conventional pens to be extremely close to the display for the digitizer to sense the pens presence. In addition, given the sensors and communications capabilities of the sensor pen, the Motion and Context Sharing Technique provides various mechanisms that can be used to optimize the behavior of computing devices and user experience based on concurrently sensing input states of the sensor pen and the computing device. Simple examples of this concept include, but are not limited to, alerting the user to a forgotten sensor pen, for example, as well as sensing whether the user is touching the display with a hand that is also grasping a sensor pen. This can be used, for example, to make fine-grained distinction among touch gestures as well as to support a variety of "palm rejection" techniques for eliminating or avoiding unintentional touch inputs.

In view of the above summary, it is clear that the Motion and Context Sharing Technique described herein uses a sensor pen to enable a variety of input techniques and gestures based on various combinations of direct-touch inputs and sensor pen inputs that are not restricted to a near-proximity sensing range of the digitizer of a computing device. In addition to the just described benefits, other advantages of the Motion and Context Sharing Technique will become apparent from the detailed description that follows hereinafter when taken in conjunction with the accompanying drawing figures.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION OF THE EMBODIMENTS

Figure 1:
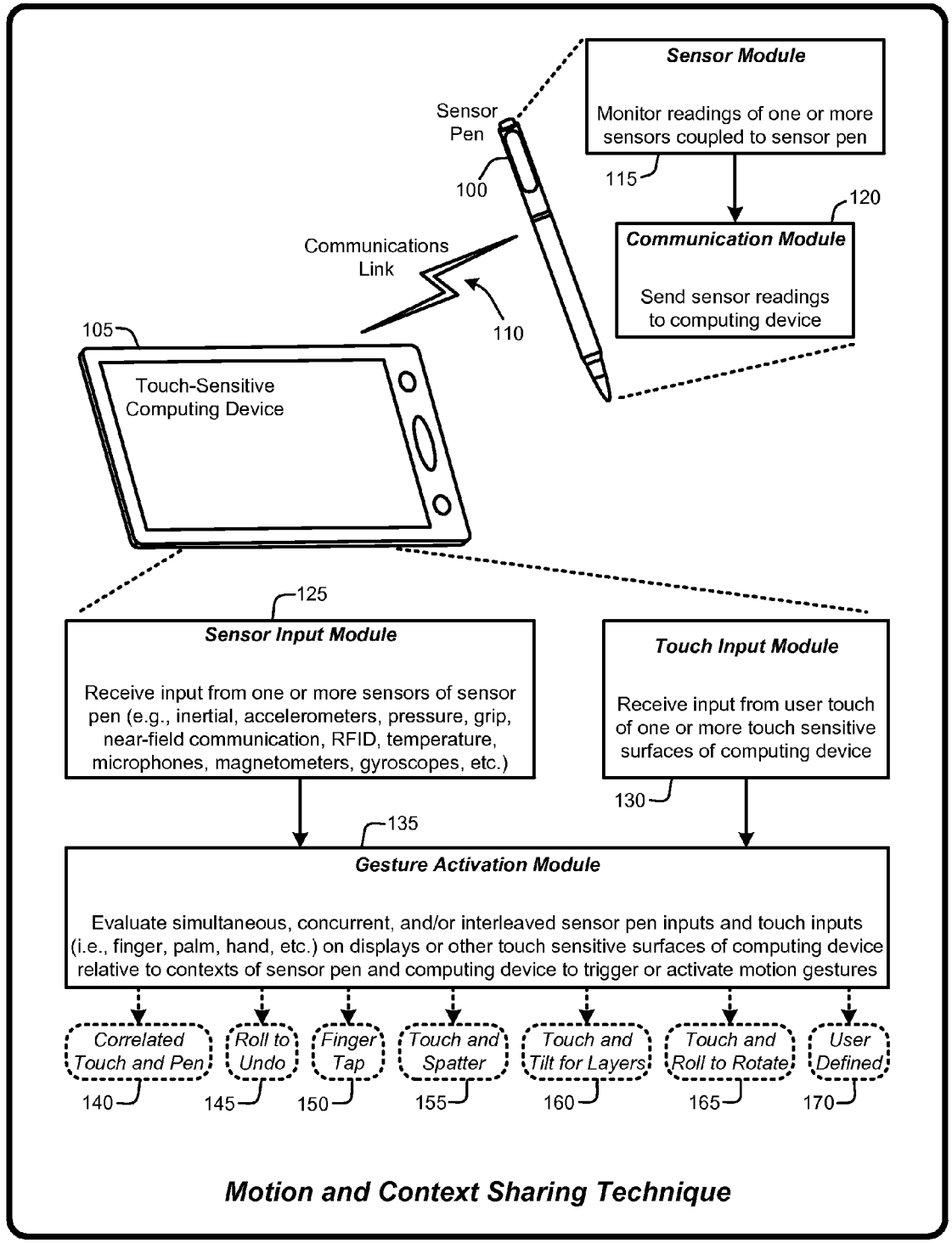
FIG. 1 shows a general operational overview of a "Motion and Context Sharing Technique" that illustrates interoperation between a sensor pen and a touch-sensitive computing for triggering one or more motion gestures or other actions, as described herein.

In the following description of the embodiments of the claimed subject matter, reference is made to the accompanying drawings, which form a part hereof, and in which is shown by way of illustration specific embodiments in which the claimed subject matter may be practiced. It should be understood that other embodiments may be utilized and structural changes may be made without departing from the scope of the presently claimed subject matter.

1.0 Introduction:

In general, a "Motion and Context Sharing Technique," as described herein, provides various techniques for using a pen or stylus enhanced with a power supply and multiple sensors, i.e., a "sensor pen," to enable a variety of input techniques and gestures. These techniques consider various combinations of pen stroke, pressure, motion, and other inputs in the context of touch-sensitive displays, in combination with various hybrid techniques that incorporate simultaneous, concurrent, sequential, and/or interleaved, sensor pen inputs and touch inputs (i.e., finger, palm, hand, etc.) on displays or other touch sensitive surfaces. These techniques enable a wide variety of motion-gesture inputs, as well sensing the context of how a user is holding or using the sensor pen, even when the pen is not in contact, or even within sensing range, of the digitizer of a touch sensitive computing device.

Note that the term pressure, as relating to pressure sensors and the like may refer to various sensor types and configurations. For example, in various cases and embodiments, pressure may refer to pen tip pressure exerted on a display. In general, pen tip pressure is typically sensed by some type of pressure transducer inside the pen, but it is also possible to have the pen tip pressure sensing done by the display/digitizer itself in some devices. In addition, the term pressure or pressure sensing or the like may also refer to a separate channel of sensing the grip pressure of the hand (or fingers) contacting an exterior casing or surface of the pen. Various sensing modalities employed by the Motion and Context Sharing Technique may separately or concurrently consider or employ both types of pressure sensing (i.e., pen tip pressure and pen grip pressure) for initiating various motion gestures.

Note that various devices used to enable some of the many embodiments of the "Motion and Context Sharing Technique" include pens, pointers, stylus type input devices, etc., that are collectively referred to herein as a "sensor pen" for purposes of discussion. Note also that the functionality described herein may be implemented in any desired form factor, e.g., wand, staff, ball racquet, toy sword, etc., for use with various gaming devices, gaming consoles, or other computing devices. Further, the sensor pens described herein are adapted to incorporate a power supply and various combinations of sensors including, but not limited to inertial sensors, accelerometers, pressure sensors, grip sensors, near-field communication sensors, RFID tags and/or sensors, temperature sensors, microphones, magnetometers, capacitive sensors, gyroscopes, etc., in combination with various wireless communications capabilities for interfacing with various computing devices. Note that any or all of these sensors may be multi-axis or multi-position sensors (e.g., 3-axis accelerometers, gyroscopes, and magnetometers). In addition, in various embodiments, the sensor pens described herein have been further adapted to incorporate memory and/or computing capabilities that allow the sensor pens to act in combination or cooperation with other computing devices, other sensor pens, or even as a standalone computing device.

The Motion and Context Sharing Technique is adaptable for use with any touch-sensitive computing device having one or more touch-sensitive surfaces or regions (e.g., touch screen, touch sensitive bezel or case, sensors for detection of hover-type inputs, optical touch sensors, etc.). Note that touch-sensitive computing devices include both single- and multi-touch devices. Examples of touch-sensitive computing devices include, but are not limited to, touch-sensitive display devices connected to a computing device, touch-sensitive phone devices, touch-sensitive media players, touch-sensitive e-readers, notebooks, netbooks, booklets (dual-screen), tablet type computers, or any other device having one or more touch-sensitive surfaces or input modalities. Note also that the touch-sensitive region of such computing devices need not be associated with a display, and furthermore that the location or type of contact-sensitive region (e.g. front of a device on the display, vs. back of device without any associated display) may be considered as an input parameter for initiating one or more motion gestures (i.e., user interface actions corresponding to the motion gesture).

Note also that the term "touch," as used throughout this document will generally refer to physical user contact (e.g., finger, palm, hand, etc.) on touch sensitive displays or other touch sensitive surfaces of a computing device using capacitive sensors or the like. Note also that virtual touch inputs relative to projected displays, electronic whiteboards, or other surfaces or objects are treated by the Motion and Context Sharing Technique in the same manner as actual touch inputs on a touch-sensitive surface. Such virtual touch inputs are detected using conventional techniques such as, for example, using cameras or other imaging technologies to track user finger movement relative to a projected image, relative to text on an electronic whiteboard, relative to physical objects, etc.

In addition, it should be understood that the Motion and Context Sharing Technique is operable with a wide variety of touch and flex-sensitive materials for determining or sensing touch or pressure. For example, one touch-sensing technology adapted for use by the Motion and Context Sharing Technique determines touch or pressure by evaluating a light source relative to some definite deformation of a touched surface to sense contact. Also, note that sensor pens, as discussed herein may include multiple types of touch and/or pressure sensing substrates. For example, sensor pens may be both touch-sensitive and/or pressure sensitive using any combination of sensors, such as, for example, capacitive sensors, pressure sensors, flex- or deformation-based sensors, etc.

In addition, the Motion and Context Sharing Technique uses a variety of known techniques to for differentiating between valid and invalid touches received by one or more touch-sensitive surfaces of the touch-sensitive computing device. Examples of valid touches and contacts include single, simultaneous, concurrent, sequential, and/or interleaved user finger touches (including gesture type touches), pen or stylus touches or inputs, hover-type inputs, or any combination thereof. With respect to invalid or unintended touches, the Motion and Context Sharing Technique disables or ignores one or more regions or sub-regions of touch-sensitive input surfaces that are expected to receive unintentional contacts, or intentional contacts not intended as inputs, for device or application control purposes. Examples of contacts that may not intended as inputs include, but are not limited to, a user's palm resting on a touch screen while the user writes on that screen with a stylus or pen, holding the computing device by gripping a touch sensitive bezel, etc.

Further, the terms "contact" or "pen input" as used herein generally refer to interaction involving physical contact (or hover) of the sensor pen with a touch sensitive surface or digitizer component of the computing device. Note also that as discussed herein, inputs provided by one or more sensors of the sensor pen will generally be referred to herein as a "sensor input," regardless of whether or not the sensor pen is within a digitizer range or even in contact with a touch sensitive surface or digitizer component of the computing device.

Consequently, it should be understood that any particular motion gestures or inputs described herein are derived from various combinations of simultaneous, concurrent, sequential, and/or interleaved pen inputs, user touches, and sensor inputs. It should be further understood that the current context or state of either or both the sensor pen and computing device is also considered when determining which motion gestures or inputs to activate or initialize.

The Motion and Context Sharing Technique described herein provides a number of advantages relating to pen or stylus based user interaction with touch-sensitive computing devices, including, but not limited to:

Adopting the perspective of context-sensing from mobile computing and applying it to motions of the stylus or sensor pen itself;

Leveraging the ability to sense tilting or other explicit motion gestures that occur close to the computing device as well as beyond the hover-sensing range of the digitizer;

Integrating both pen motions and computing device motions for initiating various actions relative to the context between the sensor pen and computing device. Simple examples of the use of such contextual information include the pen loss prevention techniques described herein;

Providing expressive application-specific gestures such as a "touch and spatter" technique for interacting with painting-type applications, as well as more generic interactions such as having the computing device respond to picking up and putting down the pen (e.g., exit or enter sleep mode, open context sensitive menu for a currently active object, etc.), or cross-application gestures such as a "vertical menu" input mechanism and support for application undo and redo sequences; and Combining pen stroke, finger touch, and motion-sensing together into hybrid, multi-modal techniques that enable new types of gestures for pen-operated tablet computers and other touch-sensitive computing devices.

1.1 System Overview:

The Motion and Context Sharing Technique operates, in part, by considering motion-based inputs from the sensor pen to trigger various actions with respect to the computing device. FIG. 1, provides a general operational overview of the Motion and Context Sharing Technique, illustrating interoperation between the sensor pen and the computing device to trigger one or more motion gestures or other actions. More specifically, FIG. 1 shows sensor pen 100 in communication with touch sensitive computing device 105 via communications link 110. As discussed in further detail herein, the sensor pen 100 includes a variety of sensors. A sensor module 115 in the sensor pen 100 monitors readings of one or more of those sensors, and provides them to a communications module 120 to be sent to the computing device 105.

The touch sensitive computing device 105 includes a sensor input module 125 that receives input from one or more sensors of sensor pen (e.g., inertial, accelerometers, pressure, grip, near-field communication, RFID, temperature, microphones, magnetometers, capacitive sensors, gyroscopes, etc.) and provides that input to a gesture activation module 135. In addition, the gesture activation module 135 also receives input from a touch input module 130 that receives input from user touch of one or more touch sensitive surfaces of the computing device 105. Given the sensor inputs and the touch inputs, if any, the gesture activation module 135 then evaluate simultaneous, concurrent, sequential, and/or interleaved sensor pen 100 inputs and touch inputs (i.e., finger, palm, hand, etc.) on displays or other touch sensitive surfaces of the computing device 105 relative to contexts of sensor pen and computing device to trigger or activate one or more motion gestures (e.g., motion gestures 140 through 170, discussed in further detail herein).

More specifically, the Motion and Context Sharing Technique senses various properties of the sensor pen relative to various distances between the sensor pen and the computing device (i.e., contact, hover range, and beyond hover range), and whether the motions of the sensor pen are correlated with a concurrent user touch of a display or some other touch-sensitive surface of the computing device or with some motion of the computing device. These sensed properties of the sensor pen are then correlated with various touches or motions of the computing device, and may also be considered in view of the current contexts of either or both the sensor pen and computing device (e.g., whether they are being held, moving, power state, application status, etc.), and used to trigger a variety of "motion gestures" or other actions.

With respect to hover range, in various embodiments, the Motion and Context Sharing Technique considers distance of the sensor pen above the digitizer of the computing device. While a variety of ranges can be considered, in various tested embodiments, three range categories were considered, including: physical contact, within hover range of the digitizer, or beyond range of the digitizer. The activation mechanism for any particular motion gestures may consider these different ranges of the sensor pen, in combination with any other correlated inputs, touches, and/or motions of the computing device.

In general, motion gestures can be grouped into various categories. Examples include motions that employ device orientation (of either or both the sensor pen and the computing device), whether absolute or relative, versus other motion types, which can be used to group different styles of motion input including hard contact forces, sensing particular patterns or gestures of movement, as well as techniques that use stability (e.g., the absence of motion or other particular sensor inputs) to trigger actions or specific contexts.

Many different motion gestures and input scenarios are enabled by the Motion and Context Sharing Technique include. Further, a wide variety of user-definable motion gestures and input scenarios are enabled by allowing the user to associate any desired combination of touches, contacts, and/or sensor pen motions with any desired action by the computing device. In other words, any particular touch inputs or combinations of touch inputs are correlated with any desired sensor inputs and/or contacts, with those correlated inputs then being used to initiate any desired action by the computing device.

Note that raw sensor readings can be reported or transmitted from the sensor pen to the computing device for evaluation and characterization by the computing device. For example, raw sensor data from inertial sensors within the sensor pen can be reported by the sensor pen to the computing device, with the computing device then determining pen orientation as a function of the data from the inertial sensors. Alternately, in various embodiments, the sensor pen uses onboard computational capability to evaluate the input from various sensors. For example, sensor data derived from inertial sensors within the sensor pen can be processed by a computational component of the sensor pen to determine pen orientation, with the orientation of tilt then being reported by the sensor pen to the computing device.

Clearly, any desired combination of reporting of raw sensor data and reporting of processed sensor data to the computing device by the sensor pen can be performed depending upon the computational capabilities of the sensor pen. However, for purposes of explanation, the following discussion will generally refer to reporting of sensor data to the computing device by the sensor pen for further processing by the computing device to determine various motion gestures or other input scenarios. A few examples of various motion gestures and input scenarios enabled by the Motion and Context Sharing Technique are briefly introduced below.

For example, one such input technique, referred to as a "touch and tilt for layers" gesture, uses a concurrent user touch and sensor pen tilt to activate or interact with different layers displayed on a screen. Note that the touch and tilt for layers gesture is initiated with the sensor pen at any desired distance from the display. Sensor pen tilt is determined by one or more of the pen sensors and reported to the computing device via the communications capabilities of the sensor pen. The touch and tilt for layers gesture is discussed in further detail herein.

A related gesture referred to as a "touch and roll to rotate" gesture, uses a concurrent user touch on a displayed object (e.g., text, shape, image, etc.) and a user initiated sensor pen rolling motion to rotate the touched object. Note that the touch and roll to rotate gesture is initiated with the sensor pen at any desired distance from the display, with sensor pen tilt being determined by one or more of the pen sensors and reported via the communications capabilities of the sensor pen. The touch and roll to rotate gesture is discussed in further detail herein.

Another gesture, referred to herein as a "roll to undo" gesture, uses sensors of the pen to detect a user initiated rolling motion of the sensor pen, with the result being to undo previous operations, regardless of whether those actions were user initiated or automatically initiated by the computing device or system. As with the touch and tilt for layers gesture, the roll to undo gesture is initiated with the sensor pen at any desired distance from the display, with sensor pen rolling motions being determined by one or more of the pen sensors and reported via the communications capabilities of the sensor pen. The roll to undo gesture is discussed in further detail herein.

Another gesture, referred to herein as a "vertical menu" gesture, uses sensors of the pen to detect a user initiated motion of the sensor pen that occurs with the pen coming into proximity range (or in contact with the screen) in an orientation approximately perpendicular relative to the computing device. For example, in one embodiment, bringing the pen close to the screen with the pen in this perpendicular pose will initiate opening or expansion of vertical software menu or the like, while motions moving away from the computing device or display (i.e., motion beyond the proximity sensing range) may initiate closing or contraction of the vertical software menu or the like. Note that these motions may act in concert with a cursor location on or near the menu location at the time that the motion of the sensor pen is detected, or with any other locus of interaction with the computing device. As with the previously noted gestures, the vertical menu gesture is initiated with the sensor pen at any desired distance from the display, with sensor pen orientation and distance being determined by one or more of the pen sensors and reported via the communications capabilities of the sensor pen. Note that various additional embodiments and considerations with respect to the vertical menu concept are discussed in further detail in Section 2.8.1

Another gesture, referred to herein as a "touch and spatter" gesture, uses sensors of the pen to detect a user initiated rapping of the sensor pen motion while the user is touching the display surface of the computing device. In general, the touch and spatter gesture operates in a drawing or painting type application to initiate an action that mimics the effect of an artist rapping a loaded paint brush on her finger to produce spatters of paint on the paper. In this case, the user touches the screen with a finger and then strikes the sensor pen against that finger (or any other finger, object, or surface). Note that, given the limited hover-sensing range of typical tablets, the tablet typically will not know the actual (x, y) location of the pen tip. Consequently, the touch and spatter gesture initiates an action that produces spatters (in a currently selected pen color) centered on the finger contact point. As with the previously noted gestures, the touch and spatter gesture is initiated with the sensor pen at any desired distance from the display, with sensor pen rapping motions being determined by one or more of the pen sensors and reported via the communications capabilities of the sensor pen. The touch and spatter gesture is discussed in further detail herein.

A similar gesture, referred to herein as a "barrel tap gesture" uses sensors of the pen to detect a user initiated finger tap on the sensor pen while the user is holding that pen. In general, the barrel tap gesture operates at any desired distance from the computing device or digitizer. More specifically, hard-contact finger taps on the barrel of the pen are used as a way to "replace" mechanical button input such as a pen barrel button, mouse button, enter key (or other keyboard press), or other button associated with the locus of interaction between the user and the computing device. The sensor pen tap gestures are generally identified as acceleration spikes from accelerometers in or on the sensor pen, consistent with a finger strike on the pen barrel. The barrel tap gesture is discussed in further detail herein.

Another similar gesture, referred to herein as a "hard stroke gesture" uses sensors of the pen to detect a fast movement (i.e., acceleration beyond a predetermined threshold) of the sensor pen when not contacting the computing device. In general, the hard stroke gesture operates at any desired distance from the computing device or digitizer, but in some embodiments the gesture is accepted at the moment the pen physically strikes the digitizer screen, and may furthermore be registered when the pen strikes the screen within an acceptable range of relative orientation to the tablet display. Such hard contact gestures with the screen can be difficult to sense with traditional pressure sensors due to sampling rate limitations, and because the relative orientation of the pen may not be known on traditional digitizers. More specifically, this particular sensor pen motion can be associated with any desired action of the computing device. In a tested embodiment, it was used to initiate a lasso type operation in a drawing program. The hard stroke gesture is discussed in further detail herein.

Other examples of correlated sensor pen motions relative to the computing device include using pen sensors (e.g., accelerometers, pressure sensors, inertial sensors, grip sensors, etc.) to determine when the sensor pen is picked up or put down by the user. By considering the current sensor pen context or state (i.e., picked up or put down) relative to a current context or state of the computing device (e.g., held by the user, power off, etc.), any desired action can be initiated (e.g., exit sleep mode in computing device when pen picked up, or enter sleep mode if pen set down).

Conversely, a similar technique considers motion of the computing device relative to the sensor pen. For example, if sensors in the computing device (e.g., accelerometers or other motion or positional sensors) indicate that the computing device is being held by a user that is walking or moving when sensors in the pen indicate that the sensor pen is stationary, an automated alert (e.g., visible, audible, tactile, etc.) is initiated by the computing device. Similarly, speakers or lights coupled to the sensor pen can provide any combination of visible and audible alerts to alert the user that the computing device is moving while the sensor pen is stationary. These types of "pen loss prevention" techniques provide additional examples of using correlated motions (or other inputs) of the sensor pen relative to the computing device to initiate various actions.

Figure 2:
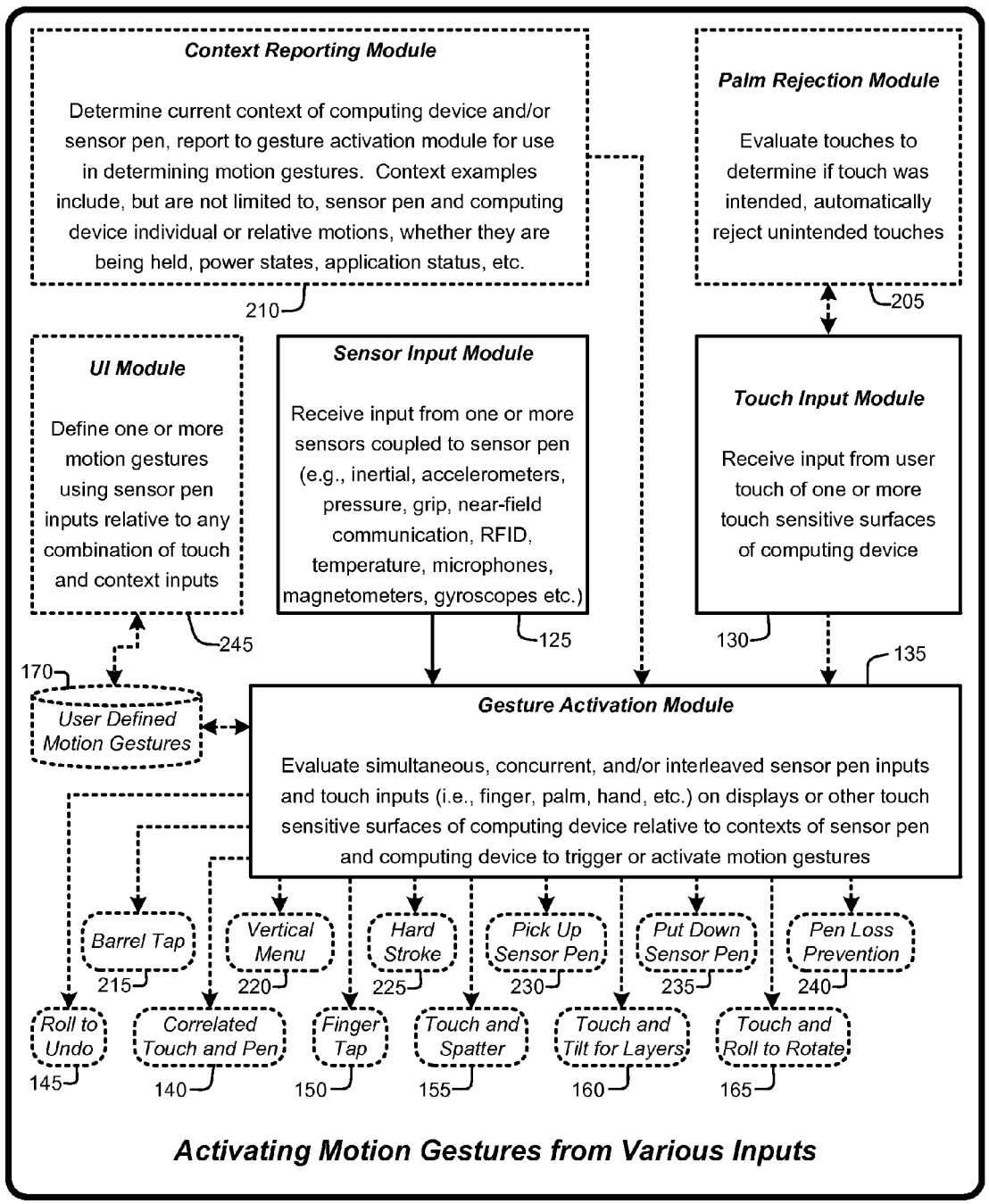
FIG. 2 provides an exemplary architectural flow diagram that illustrates program modules for implementing various embodiments of the Motion and Context Sharing Technique, as described herein.

1.2 Configuration Overview:

As noted above, the "Motion and Context Sharing Technique," provides various techniques for using a "sensor pen" to enable a variety of input techniques based on various combinations of direct-touch inputs and sensor pen inputs that are not restricted to a near-proximity sensing range of the digitizer of a computing device. The processes summarized above are illustrated by the general system diagram of FIG. 2. In particular, the system diagram of FIG. 2 illustrates the interrelationships between program modules for implementing various embodiments of the Motion and Context Sharing Technique, as described herein. Furthermore, while the system diagram of FIG. 2 illustrates a high-level view of various embodiments of the Motion and Context Sharing Technique, FIG. 2 is not intended to provide an exhaustive or complete illustration of every possible embodiment of the Motion and Context Sharing Technique as described throughout this document.

In addition, it should be noted that any boxes and interconnections between boxes that may be represented by broken or dashed lines in FIG. 2 represent alternate embodiments of the Motion and Context Sharing Technique described herein, and that any or all of these alternate embodiments, as described below, may be used in combination with other alternate embodiments that are described throughout this document. Note also that various elements of FIG. 2 were previously introduced in FIG. 1, and that any common elements between these two figures share the same element numbers.

In general, as illustrated by FIG. 2, the processes enabled by the Motion and Context Sharing Technique begin operation by providing sensor inputs from the sensor pen, touch inputs from the computing device, and context information from either or both the sensor pen and computing device to the aforementioned gesture activation module. The gesture activation module then evaluates the available inputs and information to trigger one or more motion gestures, along with any corresponding user interface (UI).

More specifically, the sensor input module 125 provides sensor inputs received from one or more sensors coupled to the sensor pen to the gesture activation module 135. In addition, the touch input module 130 provides touch inputs detected by any touch sensitive surface of the computing device to the gesture activation module 135. As noted above, virtual "touches" on various projections, surfaces, displays, objects, etc., are also considered by using various well-known techniques to track user touches on any surface, display or object.

Further, as noted above, in various embodiment, the Motion and Context Sharing Technique also rejects or ignores unwanted or unintended touches. An optional palm rejection module 205 is used for this purpose. In particular, the palm rejection module 205 evaluates any touch to determine whether that touch was intended, and then either accepts that touch as input for further processing by the touch input module 130, or rejects that touch. In addition, in various embodiments, the palm rejection module 205 disables or ignores (i.e., "rejects") user touches on or near particular regions of any touch-sensitive surfaces, depending upon the context of that touch. Note that "rejected" touches may still be handled by the Motion and Context Sharing Technique as an input to know where the palm is planted, but flagged such that unintentional button presses or gestures will not be triggered in the operating system or applications by accident.

With respect to context of the computing device and sensor pen, a context reporting module 210 reports this information to the gesture activation module 135. Specifically, the context reporting module 210 determines the current context of the computing device and/or the sensor pen, and reports that context information to the gesture activation module 135 for use in determining motion gestures. Context examples include, but are not limited to, sensor pen and computing device individual or relative motions, whether they are being held, power states, application status, etc. Furthermore, the presence or absence (loss of) a pen signal, as well as the signal strength, may be used as an aspect of context as well. For example, in the case of multiple pens, simple triangulation based on signal strengths enables the Motion and Context Sharing Technique to determine approximate relative spatial location and proximity of one or more users.

Examples of various motion gestures triggered or activated by the gesture activation module 135 include motion gestures 140 through 165, and motion gestures 215 through 240. Note that the aforementioned user defined motion gestures 170 are defined via a user interface 245 that allows the user to define one or more motion gestures using sensor pen inputs relative to any combination of touch and context inputs. Each of the motion gestures 140 through 165, and motion gestures 215 through 240 illustrated in FIG. 2 are described in further detail throughout Section 2 of this document, with examples of many of these motion gestures being illustrated by FIG. 3 through FIG. 10.

2.0 Operational Details of Motion and Context Sharing Technique:

The above-described program modules are employed for implementing various embodiments of the Motion and Context Sharing Technique. As summarized above, the Motion and Context Sharing Technique provides various techniques for using a "sensor pen" to enable a variety of input techniques based on various combinations of direct-touch inputs and sensor pen inputs that are not restricted to a near-proximity sensing range of the digitizer of a computing device. The following sections provide a detailed discussion of the operation of various embodiments of the Motion and Context Sharing Technique, and of exemplary methods for implementing the program modules described in Section 1 with respect to FIG. 1 and FIG. 2.

In particular, the following sections provides examples and operational details of various embodiments of the Motion and Context Sharing Technique, including:

An operational overview of the Motion and Context Sharing Technique;

Exemplary system hardware for implementing the sensor pen;

Exemplary interaction techniques using the sensor pen that are enabled by the Motion and Context Sharing Technique;

Exemplary context sensing techniques that consider current sensor pen context;

Correlated finger touch and sensor pen motions for initiating actions or commands;

Active sensor pen motions outside of hover range of the display for initiating actions or commands;

Sensor pen motions combined with direct touch inputs for initiating actions or commands; and Close range motion gestures of the sensor pen within hover range or contact with the display.

2.1 Operational Overview:

As noted above, the Motion and Context Sharing Technique-based processes described herein provide various techniques for using a "sensor pen" to enable a variety of input techniques based on various combinations of direct-touch inputs and sensor pen inputs that are not restricted to a near-proximity sensing range of the digitizer of a computing device More specifically, the Motion and Context Sharing Technique considers various combinations of sensor pen stroke, pressure, motion, and other sensor pen inputs to enable various hybrid input techniques that incorporate simultaneous, concurrent, sequential, and/or interleaved, sensor pen inputs and touch inputs (i.e., finger, palm, hand, etc.) on displays or other touch sensitive surfaces. This enables a variety of motion-gesture inputs relating to the context of how the sensor pen is used or held, even when the pen is not in contact or within sensing range of the computing device digitizer. In other words, any particular touch inputs or combinations of touch inputs relative to a computing device are correlated with any desired sensor pen inputs, with those correlated inputs then being used to initiate any desired action by the computing device.

2.2 Exemplary System Hardware:

In general, the sensor pen includes a variety of sensors, communications capabilities, a power supply, and logic circuitry to enable collection of sensor data and execution of firmware or software instantiated within memory accessible to the logic circuitry. For example, in a tested embodiment, the sensor pen was powered by an internal battery, and used a conventional microcontroller device to collect the sensor data and to run firmware. The sensor pen in this tested embodiment included a micro-electro-mechanical systems (MEMS) type three-axis gyroscope, as well as MEMS type three-axis accelerometer and magnetometer modules. Wireless communications capabilities were provided in the tested embodiment of the sensor pen by an integral 2.4 GHz transceiver operating at 2 Mbps. Further, in this tested embodiment, the sensor pen firmware sampled the sensors at 200 Hz and wirelessly transmitted sensor data to an associated tablet-based computing device.

Various components of this exemplary sensor pen are discussed herein in the context of user interaction with either or both the sensor pen and a tablet-type computing device (e.g., whether they are being held, moving, power state, application status, etc.) for initiating various motion gestures and other inputs. However, it must be understood that this exemplary sensor pen implementation is discussed only for purposes of illustration and explanation, and is not intended to limit the scope or functionality of the sensor pen such as types of sensors associated with the sensor pen, communications capabilities of the sensor pen, etc. Further this exemplary sensor pen implementation is not intended to limit the scope of functionality of the Motion and Context Sharing Technique or of any motion gestures or other input techniques discussed herein.

2.3 Interaction Techniques:

In general, the Motion and Context Sharing Technique considers a variety of categories of sensor pen motion and context relative to touch, motion and context of an associated touch sensitive computing device or display device. For purposes of explanation, the following discussion will refer to a sketching or drawing type application in the context of a tablet-type computing device. However, it should be understood that both the sensor pen and the Motion and Context Sharing Technique are fully capable of interaction and interoperation with any desired application type, operating system type, or touch-sensitive computing device.

In the context of the sketching application, a number of semantically appropriate mappings for various sensor pen gestures were defined within the context of inking and sketching tasks. Further, as noted above, the Motion and Context Sharing Technique also considers the context of various sensor pen gestures relative to the context of the associated computing device, and any contemporaneous user touches of the computing device to enable a variety of concurrent pen-and-touch inputs.

Note that in other application contexts, such as, for example, active reading or mathematical sketching, different gestures or mappings can be defined. In fact, as noted above, any desired user-definable gestures and concurrent pen-and-touch inputs can be configured for any desired action for any desired application, operating system, or computing device. The following sections describe various techniques, including context sensing, pen motion gestures away from the display or touch sensitive surface of the computing device, motion gestures combined with touch input, close-range motion gestures (i.e., within hover range or in contact with the display), and combined sensor pen motions. Further, it should also be understood that voice or speech inputs can be combined with any of the various input techniques discussed herein above to enable a wide range of hybrid input techniques.

2.4 Context Sensing Techniques:

Sensing the motion and resting states of both the stylus and the tablet itself offers a number of opportunities to tailor the user experience to the context of the user's naturally occurring activity. Several examples of such techniques are discussed below. Note that the exemplary techniques discussed in the following paragraphs are provided for purposes of explanation and are not intended to limit the scope of the sensor pen or the Motion and Context Sharing Technique described herein.

2.4.1 Tool Palette Appears & Disappears with Pen:

On tablet computers, there is often a tension between having tool palettes and other UI controls on the screen at all times, versus employing the entire screen for showing the user's content. Advantageously, by considering the context of the user interaction with the sensor pen and the computing device, the Motion and Context Sharing Technique provides a number of techniques for enhancing user experience with respect to such issues.

In the case of a drawing or sketching application, the user interface (UI) tools of interest to the user are often different at different times during any particular session. For example, the UI tools of interest while handwriting or sketching may be different than those of used to browse content or review work-in-progress. Consequently, in various embodiments, the Motion and Context Sharing Technique considers the context of the sensor pen to automatically fade in a stylus tool palette when the user picks up the sensor pen (as determined via one or more of the aforementioned pen sensors). In the case of a drawing application or the like, this tool palette includes tools such as color chips to change the pen color, as well as controls that change the mode of the stylus (e.g., eraser, highlighter, lasso selection, inking, etc.). Conversely, when the user puts down the pen, or holds the pen relatively still for some period of time, the palette slowly fades out to minimize distraction.

In terms of sensor pen context, picking up or lifting the sensor pen is identified (via one or more of the sensors) as a transition from a state where the pen is not moving (or is relatively still) to a state of motion above a fixed threshold. In a tested embodiment of the sensor pen, a multi-axis gyroscope sensor in the pen was used to determine sensor pen motion for this purpose due to the sensitivity of gyroscopes to subtle motions. For example, one technique used by the Motion and Context Sharing Technique identifies pen motion (e.g., picking up or lifting) whenever a three-axis sum-of-squares of gyroscope signals exceeds some threshold rotational rate (e.g., 36 deg/s). When such motion is identified, the Motion and Context Sharing Technique then triggers the palette to appear or to fade in over the course of some period of time (e.g., one second). Conversely, when the pen motion falls below the threshold rotational rate, the palette disappears or fades out over some period of time. In a tested embodiment, palette fade out occurred over a longer period of time (e.g., five seconds) than palette fade in, and if sensor pen motion resumed before this fade-out finishes, the palette quickly fades back in to full opacity.

For interaction with the palette itself, the Motion and Context Sharing Technique provides various motion gestures relative to the sensor pen to allow the palette UI to respond to either pen taps or finger taps, to allow users to interleave these input modalities to select a current pen tool and color. In this context, this enables the Motion and Context Sharing Technique to treat pen and touch inputs interchangeably. For this reason, it is also possible to call up the palette using touch alone, by tapping on it with a finger (often useful if the pen is currently not in use, for example).

In the context of other application types, picking up or lifting the pen can be used to trigger any desired menu, user interface component, or action relevant to the particular application being used.

2.4.2 Pen Loss Prevention:

One problem with pens and stylus type devices is that the user can lose or forget the pen. For example, users often leave the stylus on their desk, or forget to put it back in the tablet's pen holster after use. Unfortunately, the loss or unavailability of the pen or stylus tends to limit the use of the user's computing device to a touch-only device until such time as another pen or stylus can be obtained.

Advantageously, the Motion and Context Sharing Technique addresses this problem by sensing the context of the sensor pen relative to the computing device, and then automatically reminding or alerting the user whenever the Motion and Context Sharing Technique observes the tablet moving away without the sensor pen. Since both the sensor pen and tablet (or other computing device) have motion sensors, and they are in communication with one another, the Motion and Context Sharing Technique evaluates sensor information of the pen and tablet to infer whether or not they are moving together.

One simple example of this context is that if the tablet starts moving, and continues moving while the pen remains stationary, then a large message (e.g., "Forgot the pen?") appears on the tablet's display, either immediately, or after any desired preset delay. The message may then optionally then fade away or be dismissed by the user. This serves to remind the user to retrieve the sensor pen. Note that other alert techniques (e.g., audible, visual, tactile, etc.) on either or both the sensor pen and tablet are used in various embodiments of the Motion and Context Sharing Technique to alert the user to potential sensor pen loss. These techniques illustrate how sensing the motion states of both the tablet and sensor pen can help provide a more complete picture of the system's state.

In a related embodiment the Motion and Context Sharing Technique considers correlated gait patterns, for example, to determine if the user is walking with both pen and stylus on his person or not. Further, if sensor analysis indicates that the tablet is in a pack, purse, or not visible to a walking or moving user, an automated alert sent to the user's mobile phone is initiated in various embodiments to alert the user to potential sensor pen loss.

2.5 Correlated Finger Touch and Pen Motions:

By evaluating correspondences between touch-screen input (or touch inputs on other surfaces of the computing device) and sensor pen motions, the Motion and Context Sharing Technique infers additional information about how the user is touching the screen or other touch-sensitive surface. By correlating sensor pen motions with touch inputs, the Motion and Context Sharing Technique enables a variety of input scenarios and motion gestures.

Figure 3:
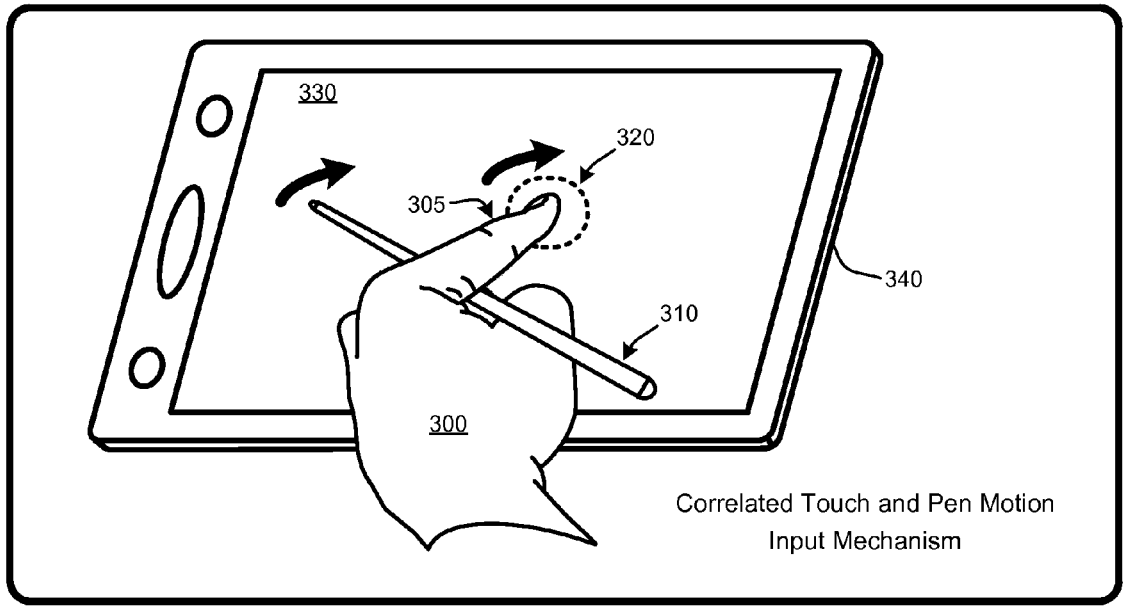
FIG. 3 provides an illustration of using the Motion and Context Sharing Technique to provide a correlated touch and sensor pen input mechanism, as described herein.

For example, if the user touches the screen with the preferred hand (i.e., the same hand that is holding the sensor pen), the Motion and Context Sharing Technique infers via analysis of sensors in either or both the computing device and the sensor pen that the pen is in motion at the same time that the touch is in motion. FIG. 3 provides a simple illustration of this scenario. In particular, in this example, the user's left hand 300 is holding a sensor pen 310, while the index finger 305 of that hand is in contact 320 with the surface of the display 330 of the computing device 340. Both the index finger 305 and the sensor pen 310 held in the hand are moving in the same direction, as illustrated by the large directional arrows.

In contrast, if the Motion and Context Sharing Technique observes a touch while the sensor pen is relatively stationary, the Motion and Context Sharing Technique infers that the touch was produced by the non-preferred hand (i.e., touch produced by the hand not holding the pen).

For example, returning to the example of a drawing or sketch type application, in various embodiments, the Motion and Context Sharing Technique provides an input mechanism where a dragging type touch with the non-preferred hand (i.e., with little or no corresponding pen motion) pans the canvas on the display screen. Conversely, a rubbing or dragging motion on an ink stroke with the preferred hand (e.g., pen is tucked between the fingers of that hand, but not in contact with the display or digitizer), digitally smudges the ink. This correlated touch and motion input mimics the action of charcoal artists who repeatedly draw some strokes, and then tuck the charcoal pencil to blend (smudge) the charcoal with a finger of the same hand.

Clearly, the user may move both hands concurrently. Consequently, even if the user is holding the pen relatively still, a small amount of motion may be sensed by one or more sensors of the sensor pen. Therefore, in various embodiments, the Motion and Context Sharing Technique ignores motions below a dynamically defined threshold by considering factors such as relative motion velocity and direction between the touch and the sensor pen (i.e., directional correlation). In addition, since an initial determination of whether a display pan or ink smudge is intended, in various embodiments the Motion and Context Sharing Technique defers the decision of panning vs. smudging for a relatively short time-window at the onset of a touch gesture while the relative motions are evaluated to make a final determination.

In various embodiments, the dynamically defined motion threshold increases when the pen is in rapid motion, and exponentially decays otherwise. This allows the Motion and Context Sharing Technique to handle the case where the user has finished smudging, but the pen may not yet have come to a complete stop, and then switches quickly to panning with the non-preferred hand. The dynamic threshold here helps the system to correctly reject the pen motion as a carry-over effect from the recently-completed smudging gesture.

In addition, by considering the sensors of both the computing device and sensor pen in a common inertial frame, the Motion and Context Sharing Technique enables various scenarios that consider corresponding directions of motion (i.e., directional correlation), thereby enabling very subtle or gentle smudging motions that might otherwise fall below a movement threshold. Advantageously, in the case that the user touches and starts moving with both hands at approximately the same time, the use of a common inertial frame enables the Motion and Context Sharing Technique to distinguish which touch point corresponds to the pen motion.

2.6 Active Pen Motion Away from the Display:

In contrast to conventional pen or stylus usage with computing devices, the Motion and Context Sharing Technique allows the sensor pen to provide input at any distance from the computing device or digitizer surface. Advantageously, the use of sensors coupled to the sensor pen in combination with the communications capabilities of the sensor pen enable the Motion and Context Sharing Technique to consider sensor pen motions independent from the computing device. This allows the Motion and Context Sharing Technique to implement various explicit sensor gestures that can be active at all times (or at particular times or in particular contexts).

One example of an of a motion gesture enabled by considering pen motions independently of the computing device" is the aforementioned "roll to undo" gesture, which uses a rolling motion of the pen (i.e., twisting or rotating the pen around the long axis of barrel). Note that this motion gesture is discussed in further detail below. Further, a number of the motion gestures and techniques discussed herein, including various context sensing techniques and various sensor pen motion gestures combined with direct touch inputs, rely on sensing the motion of the pen while it is away from the display (i.e., outside of contact and hover range of the computing device). Therefore, the ability to sense pen activity at a distance from the display enables many of the sensor pen-motion techniques discussed herein.

Figures 4, 5:
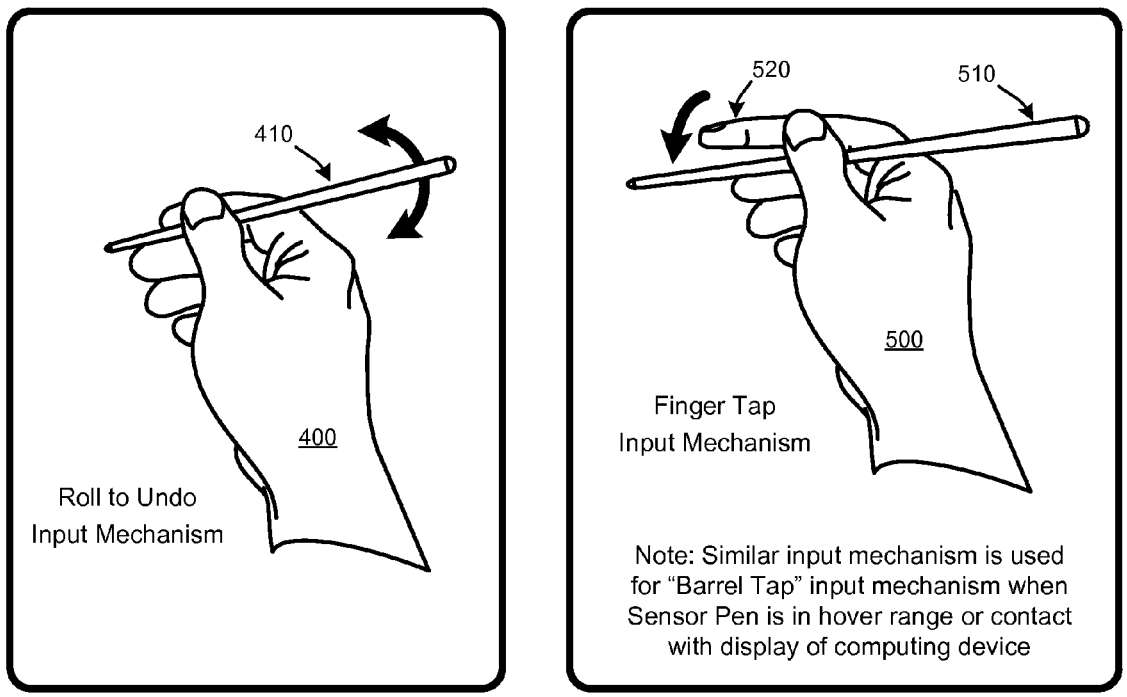
FIG. 4 provides an illustration of using the Motion and Context Sharing Technique to provide a roll to undo input mechanism, as described herein.
FIG. 5 provides an illustration of using the Motion and Context Sharing Technique to provide a finger tap input mechanism, as described herein.

2.6.1 Roll to Undo:

In various embodiments, the Motion and Context Sharing Technique considers sensor pen rolling motions as a distinct gesture for pen input. For example, the aforementioned roll to undo gesture is activated by user rolling of the sensor around the long axis of the pen, while the sensor pen is beyond hover range of the computing device. In general, rolling of the sensor pen in this manner is detected by sensors such as gyroscopic sensors or accelerometers coupled to the sensor pen. FIG. 4 provides a simple illustration of this scenario. In particular, in this example, the user's right hand 400 is holding a sensor pen 410, while the pen is rotated around the long axis of the sensor pen, as illustrated by the large directional arrow.

In one embodiment, when the Motion and Context Sharing Technique recognize this rolling gesture, the Motion and Context Sharing Technique automatically undoes the last action completed by the computing device. Alternately, in a related embodiment, when the Motion and Context Sharing Technique recognize this rolling gesture, a user interface menu appears on the screen that shows the user they have activated the Undo command. The user can then tap or touch the displayed Undo command one or more times to undo one or more preceding actions. Advantageously, these embodiments have been observed to speed up user interaction with the computing device by presenting the Undo command to the user without requiring the user to navigate the application menu structure to locate the Undo command in a menu and the wasted movement of going to the edge of the screen to invoke it.

2.6.1 Finger Tap to Redo:

To complement the aforementioned roll to undo motion gesture, the Motion and Context Sharing Technique provides a tap to redo motion gesture that is activated in response to detection of user finger taps following activation of an Undo command. As with the roll to undo gesture, that tap to redo motion gesture can be performed outside the hover range of the computing device. Similar to the Undo command, in various embodiments, a user interface menu appears on the screen that shows the user they have activated the Redo command. The user can then tap or touch the displayed Redo command one or more times to redo one or more recently undone actions.

FIG. 5 provides a simple illustration of this scenario. In particular, in this example, the user's right hand 500 is holding a sensor pen 510, while index finger 520 of that hand taps the barrel of the sensor pen, as illustrated by the large directional arrow. Note that as discussed below, a similar input mechanism is used to implement a "barrel tap" input mechanism when the sensor pen is in hover range or contact with the display of the computing device.

Advantageously, both the roll to undo and finger tap to redo motion gestures interleave stylus motion and touch input in a hybrid input scenario that takes advantage of the properties of each interaction modality, while allowing the user to keep the sensor pen close to the user's working space and, thus, the locus of attention.

2.7 Pen Motion Gestures Combined with Direct Touch:

Combined touch and sensor pen motion gestures provide an additional technique that contrasts with basic sensor pen-motion gestures (e.g., the roll to undo gesture) by adding a concurrent user touch component for activation of various input mechanisms. Advantageously, this allows the same sensor pen motion gesture used without touch to be used to initiate one or more entirely different input mechanisms when that same sensor pen motion is combined with one or more different user touch inputs. However, it should also be understood that there is no requirement for the same sensor pen motion gestures to be used when combined with various touch inputs.

For example, in addition to the roll to undo technique that interleaves pen motion and touch inputs (i.e., pen roll followed by touching displayed undo menu), the Motion and Context Sharing Technique also provides a variety of motion gestures that employ simultaneous, concurrent, sequential touch and pen motion inputs. The combination of motion gesture plus touch techniques described below for providing various user input mechanisms illustrates how new sensing modalities can build on the existing skills and habits of users who may be familiar with particular applications or type of content.

Examples of these combined motion gestures and touch input include, but are not limited to a "touch and spatter" input mechanism with respect to painting type applications, a "touch and tilt for layers" input mechanism, and a "touch and roll to rotate" input mechanism. Note that a wide range of combined motion gestures and direct touch for initiating specific input scenarios or commands is enabled by the Motion and Context Sharing Technique, and that the examples discussed below are not intended to limit the scope of the Motion and Context Sharing Technique.

2.7.1 Touch and Spatter:

Artists working in water media often employ a technique of rapping a loaded brush on the finger to produce spatters of paint on the paper. Such effects can produce natural-looking textures for foliage and landscapes. In various embodiments, the Motion and Context Sharing Technique provides a corresponding touch and pen-motion gesture that mimics this physical gesture within the context of a sketching or painting application.

Figure 6:
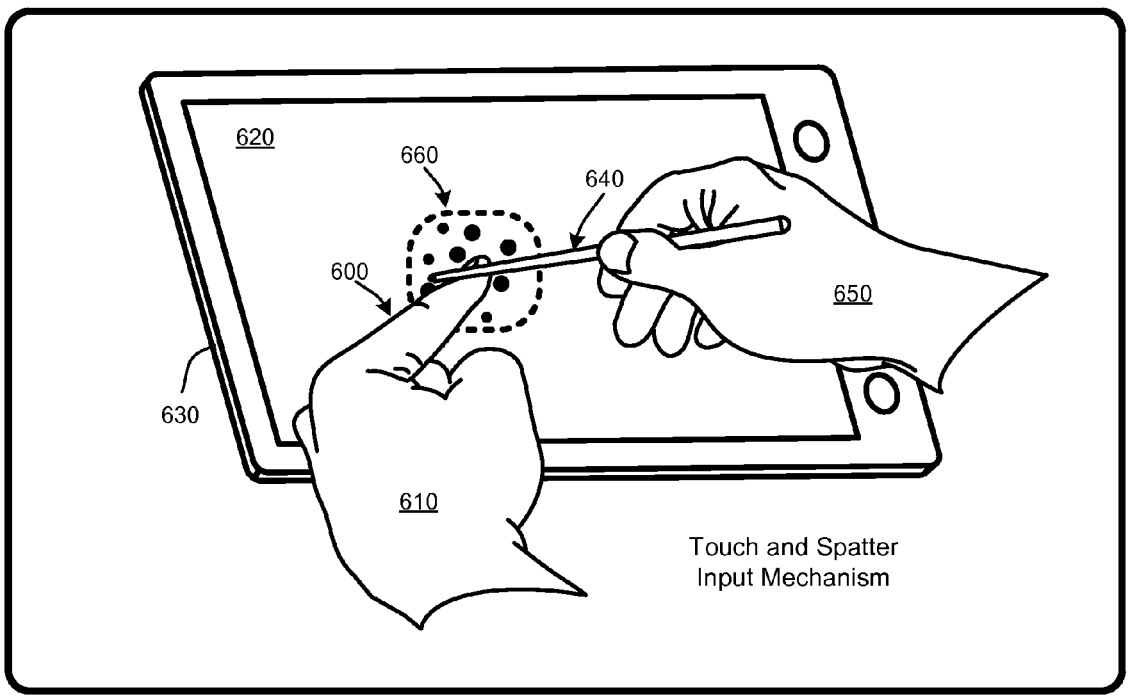
FIG. 6 provides an illustration of using the Motion and Context Sharing Technique to provide a touch and spatter input mechanism for painting, drawing, or sketching type applications, as described herein.

For example, the touch and spatter input mechanism is initiated when the user touches the screen with a finger, and then strikes the pen against that finger (or other surface) to produce spatters as if the sensor pen were a loaded paintbrush. FIG. 6 provides a simple illustration of this scenario. In particular, in this example, the index finger 600 of the user's left hand 610 is touching display 620 of computing device 630. A sensor pen 640 held in the user's right hand 650 is struck against the index finger 600 to initiate the touch and spatter input mechanism, with the result being digital paint spatters 660 in a region around the point where the index finger is touching the display 620.

Note that, given the limited hover-sensing range of typical tablets, it is likely that the pen remains out-of-range (e.g., more than ~1 cm away from the display surface) with respect to hover detection when the user performs this gesture. Therefore, the tablet does may not know the actual (x, y) location of the pen tip. Consequently, the Motion and Context Sharing Technique produces spatters (in the currently selected pen color) centered on the finger contact point when sensors in the sensor pen indicate that the user is striking the pen against the finger or other surface while the user is concurrently touching the display.

More specifically, in a tested embodiment, the Motion and Context Sharing Technique detects an acceleration peak (via accelerometers coupled to the sensor pen) corresponding to the sensor pen strike. The Motion and Context Sharing Technique then uses the amplitude of the peak to determine any desired combination of a number and transparency level of the spatters, how large the individual spatters are, and how far they scatter from the contact point. Each of these values increase with increasing acceleration peak amplitudes (corresponding to harder sensor pen strikes). The semi-transparent spatters allow the colors to mix with one another in a natural-looking manner.

Furthermore, to prevent possible unintended spatter activation, in various embodiments, the Motion and Context Sharing Technique does not respond to isolated strikes. Instead, in such embodiments, the touch and spatter input mechanism is activated by the user striking the sensor pen to finger multiple times to begin the spattering effect. This results in a short delay before the paint spatters begin while ensuring that the spatter effect is actually intended by the user.

2.7.2 Touch and Tilt for Layers:

A common problem in graphical layout applications (e.g. PowerPoint®, Photoshop®, etc.) is working with multiple layered objects that occlude one another. To address this problem, the Motion and Context Sharing Technique provides a gesture of touching an object and then pitching or tilting the pen backward (or forward) relative to the long axis of the sensor pen to reveal a list of the layered objects in z-order, or alternately, to show or cycle through those layers. The user may then tap on the objects in the list or on any of the displayed layers to select, reorder, or otherwise interact with the selected layer. This input mechanism is referred to herein as the aforementioned "Touch and Tilt for Layers" gesture. In other words, to activate the Touch and Tilt for Layers gesture, the user touches or holds an object while tilting the pen to trigger that input mechanism.

Figure 7:
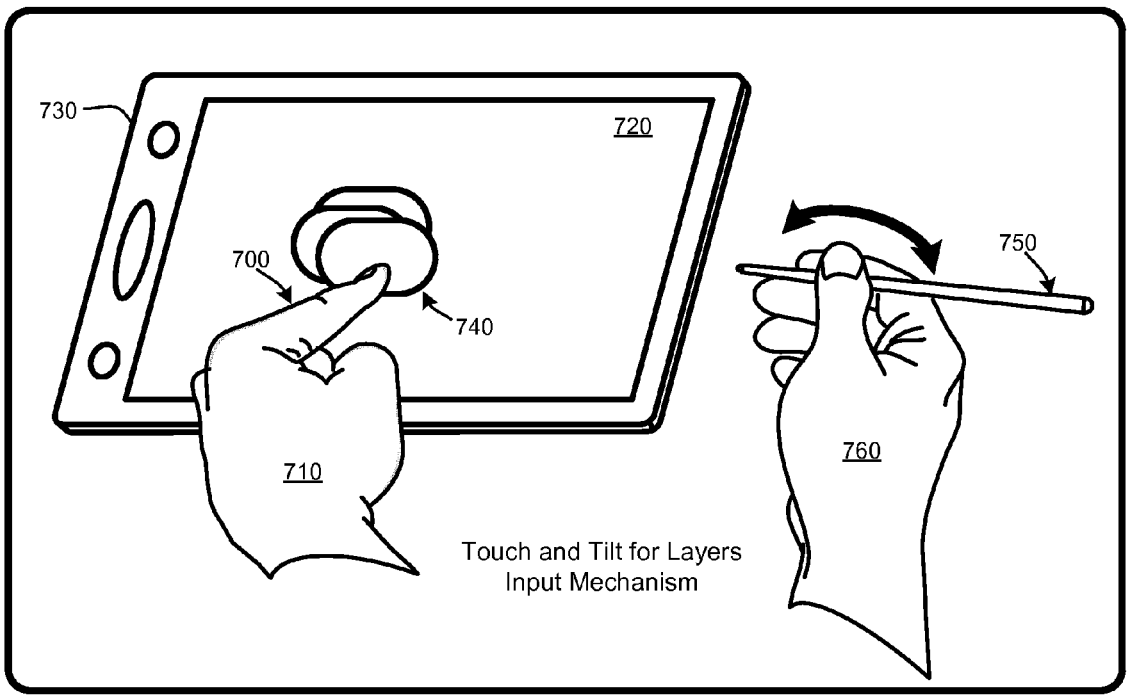
FIG. 7 provides an illustration of using the Motion and Context Sharing Technique to provide a touch and tilt for layers input mechanism, as described herein.

FIG. 7 provides a simple illustration of this scenario. In particular, in this example, the index finger 700 of the user's left hand 710 is touching an area of display 720 of computing device 730 having a plurality of layers 740 or layered objects. A sensor pen 750 held in the user's right hand 760 is tilted pen backward (or forward) relative to the long axis of the sensor pen, as illustrated by the large directional arrow, to reveal and interact with the layers 740 or layered objects corresponding the point where the index finger 700 is touching the display 720.

Note that while the pen pitching or tilting motion can be used to activate the touch and tilt for layers gesture without a concurrent touch, it was observed that arbitrary user tilting motions of the sensor pen sometimes inadvertently activated the touch and tilt for layers gesture. Consequently, in various embodiments, the Motion and Context Sharing Technique limits activation of the touch and tilt for layers gesture to contexts where the holds a finger on a stack of objects or other layers to avoids inadvertent activation of layer cycling or interactions. Therefore, in this example, the touch component of the gesture serves a double purpose. First, touching the screen activates the pen pitching motion for recognition. Second, touching the screen also identifies which objects or layer stacks the touch and tilt for layers gesture applies to.

To further limit potential inadvertent activations, in closely related embodiments, the touch and tilt for layers gesture was activated by a touch concurrent with tilting the pen away from the screen and then back towards the screen (or the opposite motions, i.e., towards and then away), within a limited time-window.

2.7.3 Touch and Roll to Rotate:

A related input mechanism, referred to herein as the aforementioned touch and roll to rotate gesture is activated by holding or touching an object on the display surface while concurrently rolling or twisting the sensor pen around the long axis of the sensor pen. Note that this gesture contrasts with the "roll to undo" gesture discussed above in that when the Motion and Context Sharing Technique infers a concurrent touch in combination with the rolling motion, the touch and roll to rotate gesture is activated instead of the roll to undo gesture (which occurs when there is no concurrent touch).

In a tested embodiment of the Motion and Context Sharing Technique, when the user touches an object and rolls the pen, this enables a rotation mode. In one embodiment, this rotation mode is implemented by allowing the user to dial his finger (i.e., move the finger in a curving motion on the display surface) to precisely rotate the object. In a related embodiment, rotation is controlled by either continuing to rotate the sensor pen, or by contacting the sensor pen on the display surface, and using the sensor pen in a manner similar to the finger dialing motion noted above.

Figure 8:
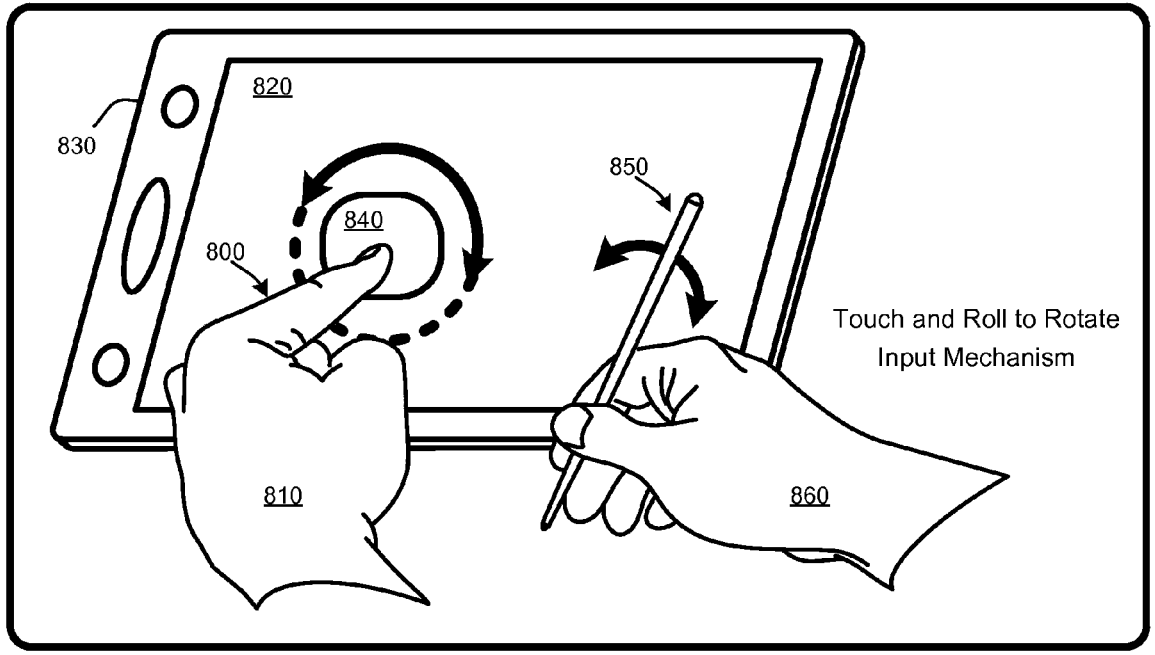
FIG. 8 provides an illustration of using the Motion and Context Sharing Technique to provide a touch and roll to rotate input mechanism, as described herein.

FIG. 8 provides a simple illustration of the touch and roll to rotate input mechanism. In particular, in this example, the index finger 800 of the user's left hand 810 is touching an area of display 820 of computing device 830 having an object 840. A sensor pen 850 held in the user's right hand 860 is rotated around the long axis of the sensor pen, as illustrated by the large directional arrow to initiate the touch and roll to rotate input mechanism. The selected object 840 is then rotated around its axis of rotation (illustrated by the large directional arrow around object 840) using either the user's finger, or additional rotation motions of the sensor pen 850.

2.8 Close-Range Motion Gestures Combined with Hover or Contact:

Similar to touch combined with sensor pen motions, the Motion and Context Sharing Technique provides additional input mechanisms that combine direct sensor pen contact or hover (i.e., sensor pen in hover range of the digitizer of the computing device). For example, input mechanisms implemented by combining sensor pen hover with sensor pen motion gestures (determined via one or more of the sensors coupled to the sensor pen) include, but are not limited to a "vertical menu" input mechanism and a "barrel tap" input mechanism, both of which use the sensed (x, y) location of the pen tip (via hover evaluation of the pen by the computing device) to determine where on the display to bring up a menu. Another input mechanism, referred to herein as a "hard stroke" input mechanism, combines direct contact of the sensor pen with the display in combination with sensor pen motions. Each of these exemplary input mechanisms are discussed in further detail below.

2.8.1 Vertical Menu:

In various embodiments, the vertical menu input mechanism is initiated by using various sensors of the pen to detect a user initiated motion of the sensor pen that occurs with the pen coming towards or into proximity range (or in contact with the screen) in an orientation approximately perpendicular relative to the display screen of the computing device. In other words, holding the sensor pen approximately perpendicular relative to the display (e.g., approximately vertical pen pose when the computing device is lying flat), and either approaching or within hover range relative to the display screen of the computing device, activates a UI window at or near the sensed (x, y) location of the pen tip, thereby enabling efficient interleaving of stroke input with menu invocation.

Note that in various embodiments, a timing factor is also considered for initiating the vertical menu. For example, in such embodiments, the vertical menu is initiated when the sensor pen is held approximately perpendicular relative to the display and approximately stationary for a short time (e.g., a fixed or adjustable time threshold) within the hover range of the display. Note that in various embodiments, the UI window of the vertical menu is initiated when the pen is an approximately perpendicular pose, for a certain amount of time, as it approaches the display, regardless of whether the pen is in a proximity or hover range of the display. Consequently, it should be clear that in such embodiments, the Motion and Context Sharing Technique indirectly uses the pen's ability to know its orientation even when it is beyond the sensing range of the computing device to successfully trigger the vertical menu.

When initiated or activated, the vertical menu input mechanism triggers a UI mode that brings up a localized (relative to the pen tip) UI menu. Consequently, bringing the pen close to the screen with the pen in this relative perpendicular pose will initiate opening or expansion of a vertical software menu or the like. Conversely, motions extending away from the computing device or display (i.e., motions moving away from the screen or beyond the proximity sensing range) may initiate closing or contraction of the vertical software menu or the like. Other mechanisms for closing the UI menu include, but are not limited to, automatically closing the menu after the user picks a command from the UI menu, in response to taps (pen or finger) somewhere else on the screen, detection of some other motion gesture, etc.

Advantageously, menus that appear at or near the locus of interaction (i.e., near the pen tip) can save the user from round-trips with the sensor pen (or other pointing device) to tool palettes or other menus at the edge of the screen. Such localized menus are particularly useful for frequent commands, as well as contextual commands such as Copy and Paste that integrate object selection and direct manipulation with commands. Similarly, in various embodiments, the Motion and Context Sharing Technique initiates context sensitive menus, application popups, etc., when activated by the vertical menu input mechanism.

In various embodiments, the vertical menu input mechanism initiates a marking menu when the pen is held approximately perpendicular relative to the display and approximately stationary for a short time within the hover range of the display. Note that marking menus are also sometimes referred to as "pie menus" or "radial menus." In general, the marking menu provides a generally circular context menu where selection of a menu item depends on direction. Marking menus may be made of several "pie slices" or radially arranged menu options or commands around a center that may be active or inactive. Each such slice may include any number of menu items (similar to a list or set of menu items in a conventional drop down menu). Further, in various embodiments, commands or menu items in the marking menu are user-definable, and of course, vertical menus could be employed with other well-known types of command selection techniques, such as drawing gestures or picking from traditional pull-down menus as well. In this sense, the "vertical menu" can be conceived as a general purpose mode-switching technique, which enables the pen to input commands, gestures, or perform other tasks secondary to a primary "inking" state.

In one embodiment, the marking menu is initiated as simply a display of directions (e.g., arrows, lines, icons, etc.), radiating out from a center of the marking menu, in which the sensor pen can be stroked to initiate commands without displaying a visible menu of commands. Once this marking menu is displayed, the user may then bring the stylus or sensor pen into contact with the display and stroke in any of the displayed directions to invoke a command. In various embodiments, if the user continues to hold the pen relatively stationary for a short period of time, the Motion and Context Sharing Technique initiates marking menu pops up that reveal a mapping of stroke direction to command. The vertical menu input mechanism thus combines stylus motion and pen-tip stroke input in the same technique.

In various embodiments, the vertical menu input mechanism is activated relative to a particular object when the user places the sensor pen over the object in a pose that is approximately perpendicular relative to the display. In this case, the marking menu includes object-specific commands (e.g. copy, paste, etc.) that take the current object and screen location as operands. Advantageously, this integrates object selection and command invocation into a single fluid pen gesture rather than requiring the user to perform a sequence of actions to achieve the same result.

In operation, the Motion and Context Sharing Technique uses an approximately perpendicular posture of the sensor pen relative to the display to trigger the vertical menu input mechanism from the hover-state. The approximately perpendicular posture of the sensor pen relative to the display is detected using a combination of the accelerometer and gyroscope sensors coupled to the sensor pen relative to a sensed orientation of the display. The accelerometer is used to estimate the orientation of the pen, but even if the accelerometer indicates that the pen is relatively near-perpendicular, this sensor reading will not trigger the vertical menu input mechanism when the gyroscope indicates that the pen is still moving beyond some threshold amount. In this way, the Motion and Context Sharing Technique avoids false positive activation of the marking menu if the user briefly passes through an approximately perpendicular relative pose while handling the sensor pen.

Figure 9:
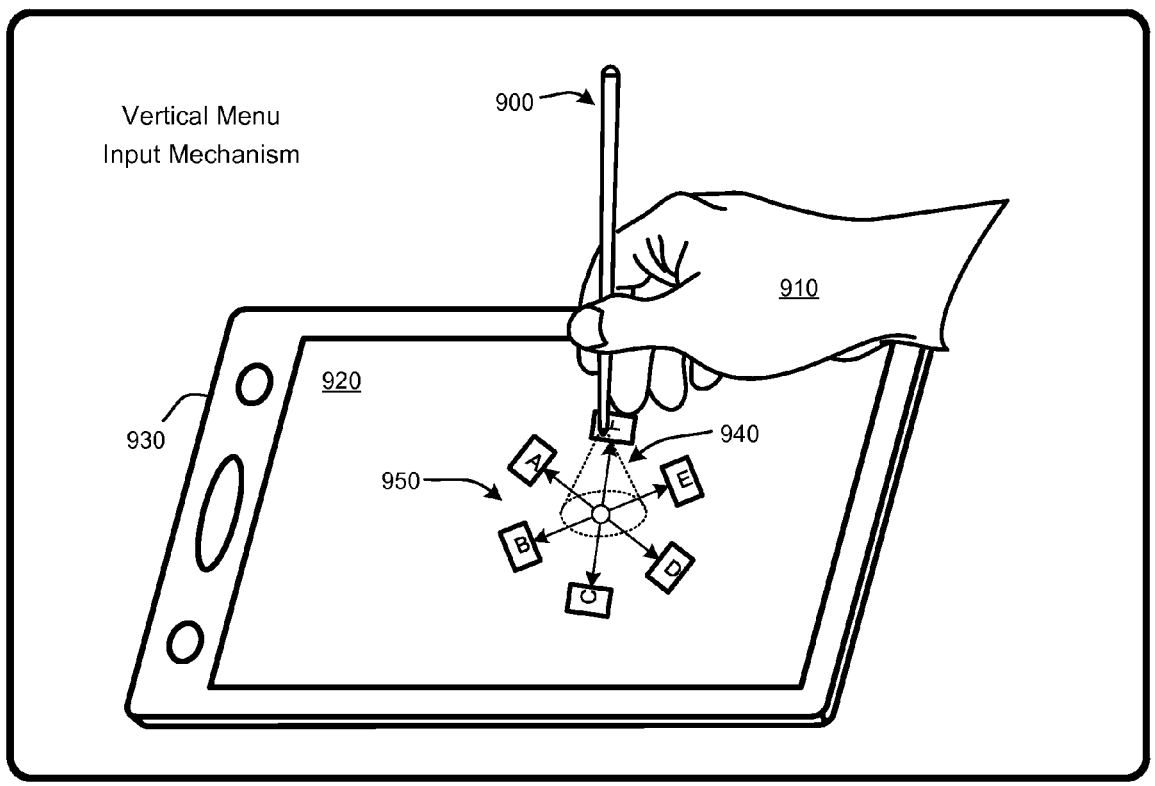
FIG. 9 provides an illustration of using the Motion and Context Sharing Technique to provide a vertical menu input mechanism, as described herein.

FIG. 9 provides a simple illustration of a vertical menu input scenario. In particular, in this example, a sensor pen 900 held in the user's right hand 910 is in hover range above the display 920 of computing device 930. Note that hover is indicated in this figure by the cone 940 shown by broken lines extending from the tip of the sensor pen 900. By holding the sensor pen 900 approximately vertical within hover range of the display 920, the Motion and Context Sharing Technique initiates a marking menu 950, which in this example includes menu options or command choices A through F. The user selects or initiates any of these commands by either touching one of the displayed commands, sweeping or stroking the sensor pen 900 in the direction of one of the displayed commands, or contacting one of the displayed commands with the sensor pen.

2.8.2 Barrel Tap:

One mechanism by which the sensor pen can implement button presses is to simply include one or more buttons or the like on the barrel of the sensor pen, with button presses then being communicated by the pen to the computing device. However, since the sensor pen includes a variety of sensors, the Motion and Context Sharing Technique instead uses one or more of the existing sensors to identify user finger taps on the barrel of the sensor pen to initiate a barrel tap input mechanism. This barrel tap input mechanism can be used for any of a variety of purposes, including, but not limited to, button press emulations.

In general, the barrel tap input mechanism is activated by sensing relatively hard-contact finger taps on the barrel of the pen as a way to "replace" mechanical button input. In a tested embodiment, the Motion and Context Sharing Technique evaluates accelerometer data to identify an acceleration spike approximately perpendicular to the long axis of the sensor pen while the pen is approximately stationary in the hover state or in direct contact with the display. Activation of the barrel tap input mechanism brings up a menu with commands specific to the object that the user hovers over or contacts with the sensor pen, with that menu being approximately centered under the pen tip.

Note that the barrel tap input mechanism differs from the aforementioned "finger tap" input mechanism in that the finger tap mechanism is performed without a concurrent touch or hover relative to the computing device, while the barrel tap input mechanism is performed while the pen is in hover range or contact within a displayed object.

2.8.3 Hard Tap and Hard Drag Input Mechanisms:

In various embodiments, the Motion and Context Sharing Technique provides additional input mechanisms initiated by the sensor pen that are roughly analogous to "hard tap" and "hard drag" techniques that been implemented using existing finger touch inputs.

However, rather than using the finger to provide touch inputs, the Motion and Context Sharing Technique instead evaluates accelerometer thresholds to determine whether the user intends a hard tap or a hard drag input using the sensor pen. In a tested embodiment in a drawing type application, bringing the stylus or sensor pen down relatively hard on the display surface results in a hard tap input mechanism that triggers a lasso mode, whereas relatively softer sensor pen strokes on the display surface result in a hard drag input mechanism that produces digital ink. Adjustable or customizable accelerometer thresholds for distinguishing the "hard" contact from softer strokes are used by the Motion and Context Sharing Technique. Further, in various embodiments, the angle at which a user is holding the pen when it comes into contact with the display is considered by the Motion and Context Sharing Technique for differentiating between the two input mechanisms.

Figure 10:
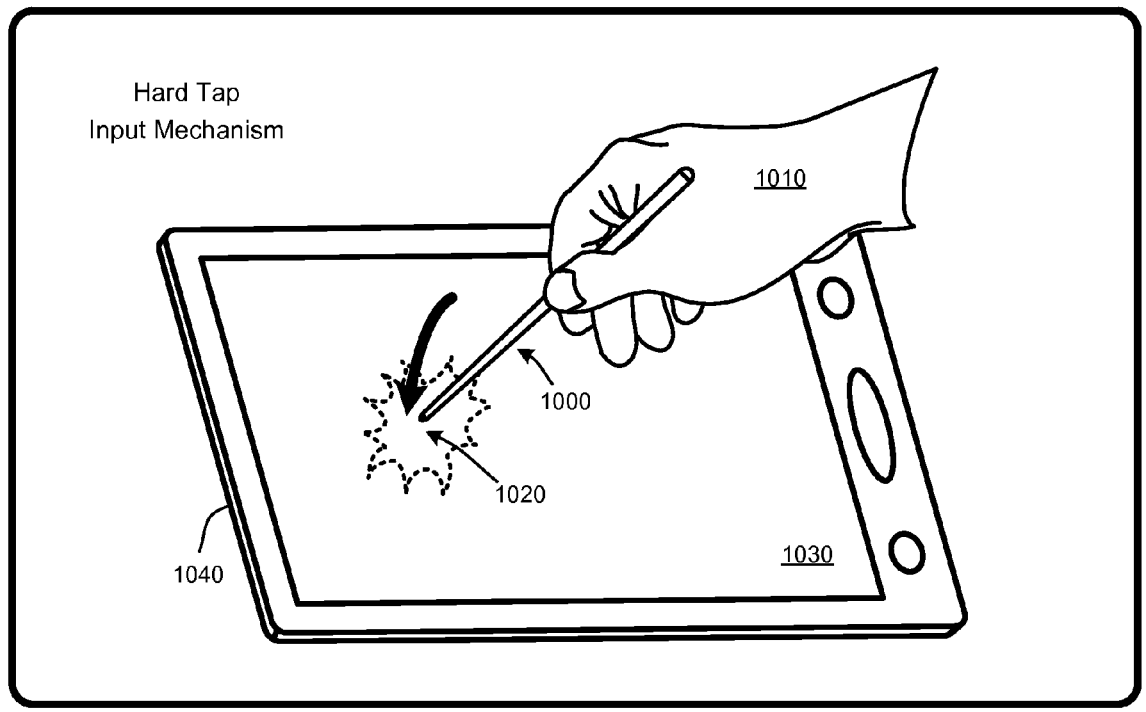
FIG. 10 provides an illustration of using the Motion and Context Sharing Technique to provide a hard tap input mechanism, as described herein.

FIG. 10 provides a simple illustration of the hard tap input mechanism. In particular, in this example, a sensor pen 1000 held in the user's right hand 1010 is brought down relatively hard onto a point 1020 of the display 1030 of computing device 1040. The resulting contact of the sensor pen 1000 onto the surface of display 1030 (identified using accelerometers of the sensor pen) initiates the hard tap input mechanism that triggers the aforementioned lasso mode. The user then uses either a finger touch or drags the sensor pen 1000 across the surface of the display 1030 to draw lasso outlines for use in selecting objects, regions, etc., in the drawing type application.

Figure 11:
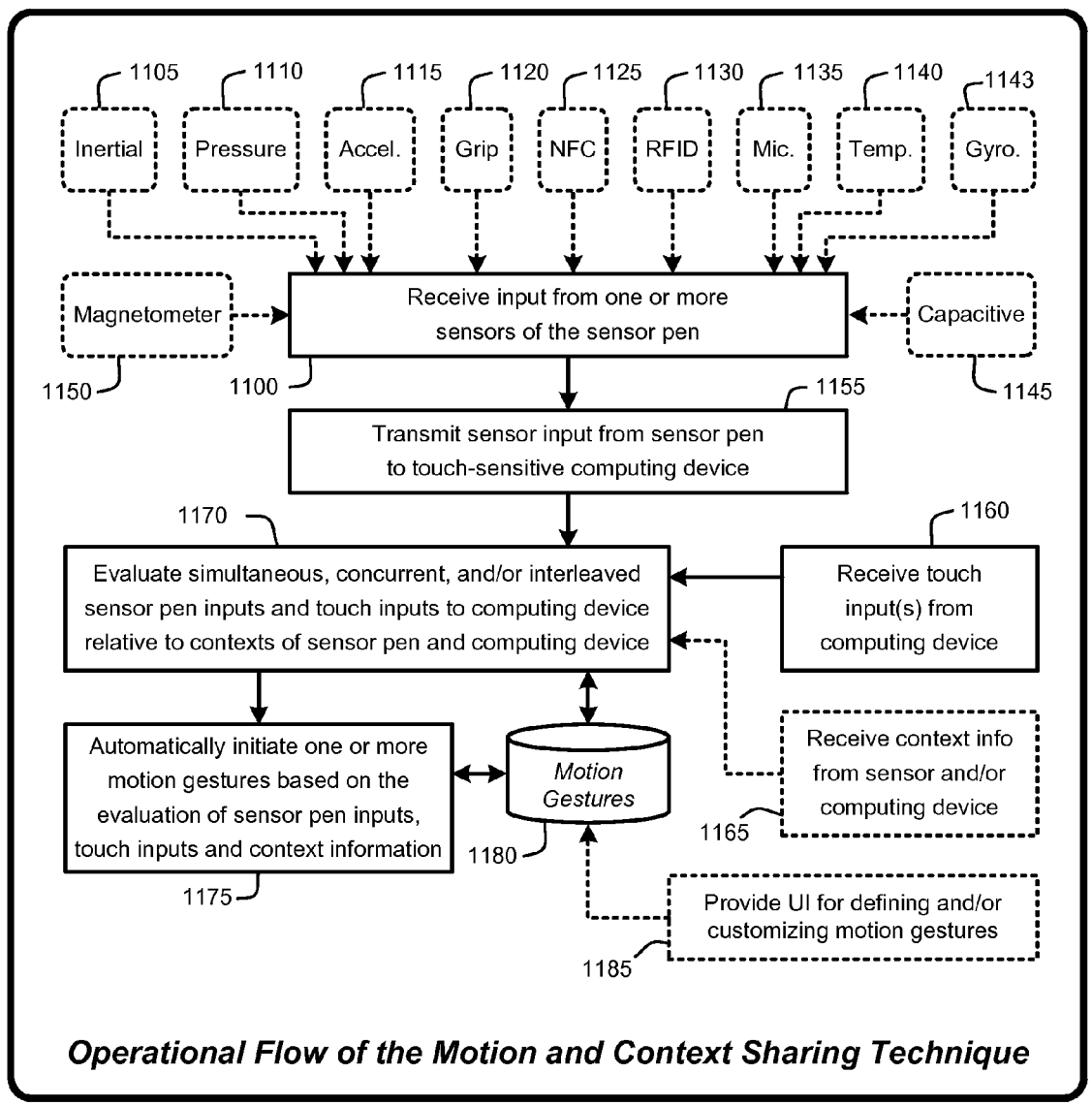
FIG. 11 illustrates a general system flow diagram that illustrates exemplary methods for implementing various embodiments of the Motion and Context Sharing Technique, as described herein.

3.0 Operational Summary:

The processes described above with respect to FIG. 1 through FIG. 10, and in further view of the detailed description provided above in Sections 1 and 2, are illustrated by the general operational flow diagram of FIG. 11. In particular, FIG. 11 provides an exemplary operational flow diagram that summarizes the operation of some of the various embodiments of the Motion and Context Sharing Technique. Note that FIG. 11 is not intended to be an exhaustive representation of all of the various embodiments of the Motion and Context Sharing Technique described herein, and that the embodiments represented in FIG. 11 are provided only for purposes of explanation.

Further, it should be noted that any boxes and interconnections between boxes that are represented by broken or dashed lines in FIG. 11 represent optional or alternate embodiments of the Motion and Context Sharing Technique described herein, and that any or all of these optional or alternate embodiments, as described below, may be used in combination with other alternate embodiments that are described throughout this document.

In general, as illustrated by FIG. 11, the Motion and Context Sharing Technique begins operation by receiving 1100 sensor input from one or more sensors (1105 through 1150) of the sensor pen. These inputs are then transmitted 1155 from the sensor pen to the touch-sensitive computing device. The Motion and Context Sharing Technique also receives 1160 one or more touch inputs from the touch-sensitive computing device. Further, the Motion and Context Sharing Technique also optionally receives 1165 context information from either or both the sensor pen and the context sensitive computing device.

The Motion and Context Sharing Technique then evaluates 1170 simultaneous, concurrent, sequential, and/or interleaved sensor pen inputs and touch inputs relative to contexts of sensor pen and computing device. This evaluation serves to identify one or more motion gestures 1180 corresponding to the various sensor, touch and context inputs. The Motion and Context Sharing Technique then automatically initiates 1175 one or more motion gestures 1180 based on the evaluation. Finally, as noted above, in various embodiments, a UI or the like is provided 1185 for use in defining and/or customizing one or more of the motion gestures 1180.

Figure 12:
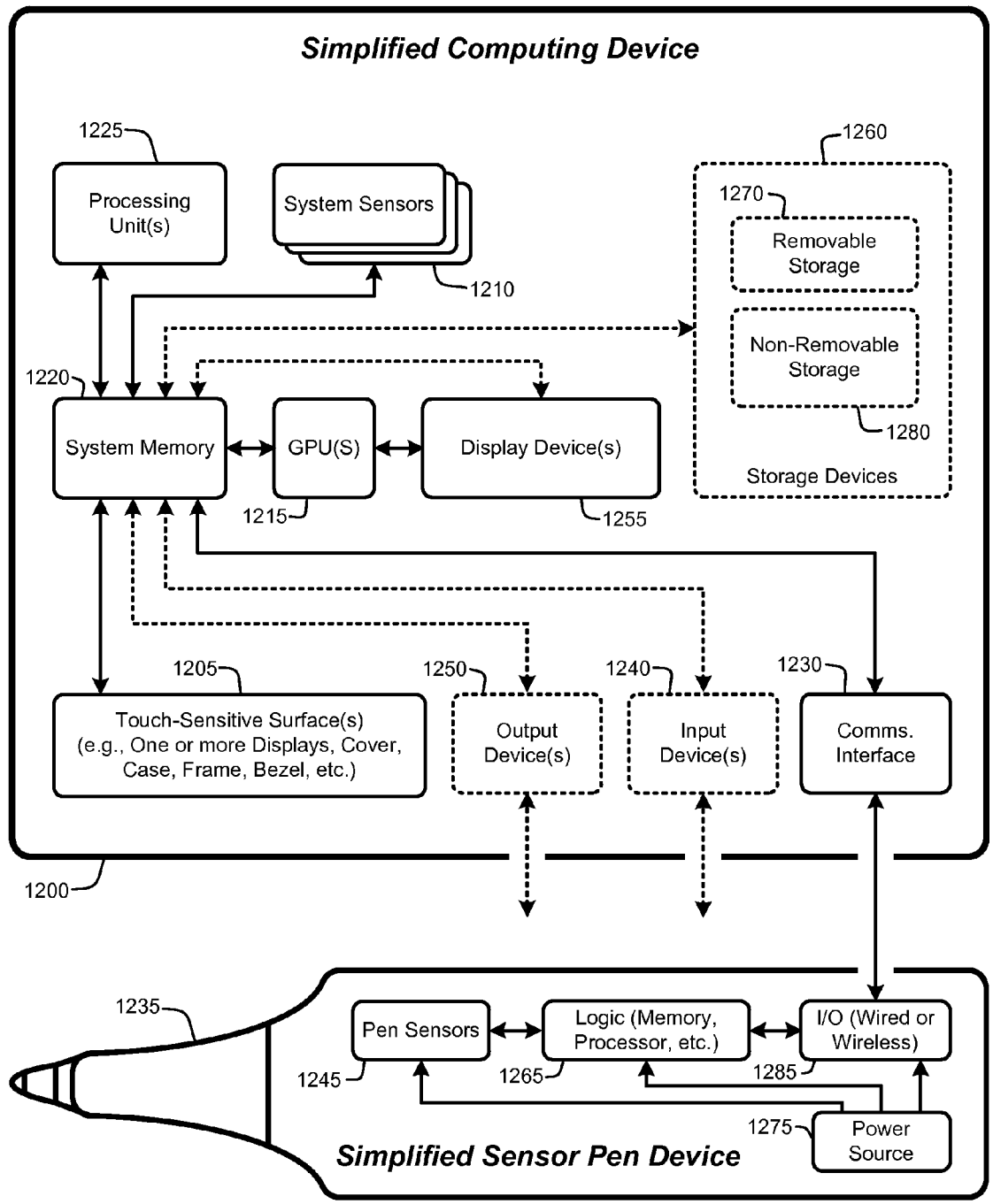
FIG. 12 is a general system diagram depicting a simplified general-purpose computing device having simplified computing and I/O capabilities, in combination with a sensor pen having various sensors, power and communications capabilities, for use in implementing various embodiments of the Motion and Context Sharing Technique, as described herein.

4.0 Exemplary Operating Environments:

The Motion and Context Sharing Technique described herein is operational within numerous types of general purpose or special purpose computing system environments or configurations. FIG. 12 illustrates a simplified example of a general-purpose computer system in combination with a stylus or pen enhanced with various sensors with which various embodiments and elements of the Motion and Context Sharing Technique, as described herein, may be implemented. It should be noted that any boxes that are represented by broken or dashed lines in FIG. 12 represent alternate embodiments of the simplified computing device and sensor pen, and that any or all of these alternate embodiments, as described below, may be used in combination with other alternate embodiments that are described throughout this document.

For example, FIG. 12 shows a general system diagram showing a simplified touch-sensitive computing device 1200. In general, such touch-sensitive computing devices 1200 have one or more touch-sensitive surfaces 1205 or regions (e.g., touch screen, touch sensitive bezel or case, sensors for detection of hover-type inputs, optical touch sensors, etc.). Examples of touch-sensitive computing devices 1200 include, but are not limited to, touch-sensitive display devices connected to a computing device, touch-sensitive phone devices, touch-sensitive media players, touch-sensitive e-readers, notebooks, netbooks, booklets (dual-screen), tablet type computers, or any other device having one or more touch-sensitive surfaces or input modalities.

To allow a device to implement the Motion and Context Sharing Technique, the computing device 1200 should have a sufficient computational capability and system memory to enable basic computational operations. In addition, the computing device 1200 may include one or more sensors 1210, including, but not limited to, accelerometers, cameras, capacitive sensors, proximity sensors, microphones, multi-spectral sensors, pen or stylus digitizer, etc. As illustrated by FIG. 12, the computational capability is generally illustrated by one or more processing unit(s) 1225, and may also include one or more GPUs 1215, either or both in communication with system memory 1220. Note that the processing unit(s) 1225 of the computing device 1200 of may be specialized microprocessors, such as a DSP, a VLIW, or other microcontroller, or can be conventional CPUs having one or more processing cores, including specialized GPU-based cores in a multi-core CPU.

In addition, the computing device 1200 may also include other components, such as, for example, a communications interface 1230 for receiving communications from sensor pen device 1235. The computing device 1200 may also include one or more conventional computer input devices 1240 or combinations of such devices (e.g., pointing devices, keyboards, audio input devices, voice or speech-based input and control devices, video input devices, haptic input devices, touch input devices, devices for receiving wired or wireless data transmissions, etc.). The computing device 1200 may also include other optional components, such as, for example, one or more conventional computer output devices 1250 (e.g., display device(s) 1255, audio output devices, video output devices, devices for transmitting wired or wireless data transmissions, etc.). Note that typical communications interfaces 1230, input devices 1240, output devices 1250, and storage devices 1260 for general-purpose computers are well known to those skilled in the art, and will not be described in detail herein.

The computing device 1200 may also include a variety of computer readable media. Computer readable media can be any available media that can be accessed by computer device 1200 via storage devices 1260 and includes both volatile and nonvolatile media that is either removable 1270 and/or non-removable 1280, for storage of information such as computer-readable or computer-executable instructions, data structures, program modules, or other data. By way of example, and not limitation, computer readable media may comprise computer storage media and communication media. Computer storage media refers to tangible computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the Motion and Context Sharing Technique described herein, or portions thereof, may be stored, received, transmitted, or read from any desired combination of computer or machine readable media or storage devices and communication media in the form of computer executable instructions or other data structures.

Finally, the Motion and Context Sharing Technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

The sensor pen device 1235 illustrated by FIG. 12 shows a simplified version of a pen or stylus augmented with pen sensors 1245, logic 1265, a power source 1275, and basic I/O capabilities 1285. As discussed above, examples of pen sensors 1245 for use with the sensor pen device 1235 include, but are not limited to, inertial sensors, accelerometers, pressure sensors, grip sensors, near-field communication sensors, RFID tags and/or sensors, temperature sensors, microphones, magnetometers, capacitive sensors, gyroscopes, etc.

In general, the logic 1265 of the sensor pen device 1235 is similar to the computational capabilities of computing device 1200, but is generally less powerful in terms of computational speed, memory, etc. However, the sensor pen device 1235 can be constructed with sufficient logic 1265 such that it can be considered a standalone capable computational device.

The power source 1275 of the sensor pen device 1235 is implemented in various form factors, including, but not limited to, replaceable batteries, rechargeable batteries, capacitive energy storage devices, fuel cells, etc. Finally, the I/O 1285 of the sensor pen device 1235 provides conventional wired or wireless communications capabilities that allow the sensor pen device to communicate sensor data and other information to the computing device 1200.

The foregoing description of the Motion and Context Sharing Technique has been presented for the purposes of illustration and description. It is not intended to be exhaustive or to limit the claimed subject matter to the precise form disclosed. Many modifications and variations are possible in light of the above teaching. Further, it should be noted that any or all of the aforementioned alternate embodiments may be used in any combination desired to form additional hybrid embodiments of the Motion and Context Sharing Technique. It is intended that the scope of the invention be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented process, comprising using a computer to perform process actions for:
    receiving sensor inputs from a plurality of sensors coupled to a stylus device while the stylus device is outside a hover range of a touch-sensitive computing device, said sensor inputs representing one or more intentional user interactions with the stylus device;
    detecting one or more finger touches on any touch sensitive surface of the touch-sensitive computing device, said finger touches occurring while the intentional user interactions with the stylus device are occurring;
    evaluating the sensor inputs in combination with the finger touches to identify an intended motion gesture from a plurality of available motion gestures; and
    initiating a user interface action corresponding to the intended motion gesture in an application executing on the touch-sensitive computing device.

2. The computer-implemented process of claim 1 wherein one or more of the sensors are used to determine intentional motion of the stylus device relative to concurrent intentional motion of the touch-sensitive computing device, and wherein those intentional motions are correlated for use in identifying the intended motion gesture.

3. The computer-implemented process of claim 1 further comprising initiating an alert on the touch-sensitive computing device when one or more sensors coupled to the touch-sensitive computing device indicate that the touch-sensitive computing device is moving away from the stylus device.

4. The computer-implemented process of claim 1 wherein one or more of the sensors are used to determine orientation of the stylus device relative to the touch-sensitive computing device, and wherein that relative orientation is used to identify the intended motion gesture.

5. The computer-implemented process of claim 1 wherein the finger touches include movement of one or more fingers across any touch sensitive surface of the touch-sensitive computing device.

6. The computer-implemented process of claim 1 further comprising a user interface for specifying sensor inputs and touches corresponding to one or more of the plurality of available motion gestures.

7. The computer-implemented process of claim 1 wherein one or more of the sensors indicate a rotation of the stylus device around a long axis of the stylus device concurrently with a touch of an object displayed on a touch screen of the touch-sensitive computing device, and wherein the intended motion gesture corresponds to a user interface action for rotating the touched object.

8. The computer-implemented process of claim 1 wherein one or more of the sensors indicate that the stylus device is in an approximately perpendicular orientation relative to a touch screen of the touch-sensitive computing device, and wherein the intended motion gesture corresponds to a user interface action for activating a marking menu on the display device.

9. The computer-implemented process of claim 1 wherein one or more of the sensors indicate a rotation of the stylus device around a long axis of the stylus device, and wherein the intended motion gesture corresponds to a user interface action for undoing a prior action of the application executing on the touch-sensitive computing device.

10. The computer-implemented process of claim 1 wherein one or more of the sensors are used to determine when the stylus device is picked up from a surface, and wherein the intended motion gesture corresponds to a user interface action for presenting a context sensitive menu relating to a currently active object in the application executing on the touch-sensitive computing device.

11. The computer-implemented process of claim 1 wherein one or more of the sensors are used to determine motion of the stylus device and motion of a touch on the touch-sensitive computing device, and when the those motions are in generally the same direction, using the directional correlation of those motions to identify the intended motion gesture.

12. A method for initiating actions in an application executing on a touch-sensitive computing device, comprising:
    receiving sensor inputs from a plurality of sensors coupled to a stylus device while the stylus device is outside a hover range of a touch-sensitive computing device, said sensor inputs representing one or more intentional user interactions with the stylus device;
    detecting one or more finger touches on any touch sensitive surface of the touch-sensitive computing device, said finger touches occurring while the intentional user interactions with the stylus device are occurring;
    evaluating the sensor inputs in combination with any finger touches to identify an intended motion gesture from a plurality of available motion gestures; and
    initiating a user interface action corresponding to the intended motion gesture in an application executing on the touch-sensitive computing device.

13. The method of claim 12 wherein one or more of the sensors indicate tapping on a barrel of the stylus device, and wherein the intended motion gesture corresponds to a user interface action for emulating a button press of an input device.

14. The method of claim 12 wherein one or more of the sensors indicate tapping on a barrel of the stylus device, and wherein the intended motion gesture corresponds to a user interface action for redoing a prior action of the application executing on the touch-sensitive computing device.

15. The method of claim 12 wherein one or more of the sensors indicate a tilting of the stylus device relative to a display of the touch-sensitive computing device, and wherein a finger touch on the touch-sensitive computing device corresponds to two or more layers objects, and wherein the intended motion gesture corresponds to a user interface action for cycling between the layers.

16. The method of claim 12 wherein the application executing on the touch-sensitive computing device is a painting type application and wherein one or more of the sensors indicate rapping of the stylus device against a surface while there is a touch on a display of the touch-sensitive computing device, and wherein the intended motion gesture corresponds to a user interface action for digitally spattering a plurality of digital paint drops around the touch on the display.

17. A computer storage media having computer executable instructions stored therein, said instructions causing a computing device to execute a method comprising:
   receiving sensor inputs from a plurality of sensors coupled to a stylus device while the stylus device is outside a hover range of a touch-sensitive computing device, said sensor inputs representing one or more intentional user interactions with the stylus device;
   detecting one or more finger touches on any touch sensitive surface of the touch-sensitive computing device, said finger touches occurring at the same time as the sensor inputs received from the stylus device;
   evaluating the sensor inputs in combination with any finger touches to identify an intended motion gesture from a plurality of available motion gestures; and
   initiating a user interface action corresponding to the intended motion gesture in an application executing on the touch-sensitive computing device.

18. The computer storage media of claim 17 wherein one or more of the sensors are used to determine motion of the stylus device relative to motion of the touch-sensitive computing device, and wherein those motions are correlated for use in identifying the intended motion gesture.

19. The computer storage media of claim 17 further comprising initiating an alert on the touch-sensitive computing device when one or more sensors coupled to the touch-sensitive computing device indicate that the touch-sensitive computing device is moving away from the stylus device.

20. The computer storage media of claim 17 wherein one or more of the sensors are used to determine orientation of the stylus device relative to the touch-sensitive computing device, and wherein that relative orientation is used to identify the intended motion gesture.

* * * * *